(12) United States Patent
Nair et al.

(10) Patent No.: US 12,333,643 B2
(45) Date of Patent: Jun. 17, 2025

(54) TECHNIQUES FOR RESIZING VIRTUAL OBJECTS

(71) Applicant: Apple Inc., Cupertino, CA (US)

(72) Inventors: Rahul Nair, Hayward, CA (US); Gregory Lutter, Boulder Creek, CA (US)

(73) Assignee: Apple Inc., Cupertino, CA (US)

( * ) Notice: Subject to any disclaimer, the term of this patent is extended or adjusted under 35 U.S.C. 154(b) by 240 days.

(21) Appl. No.: 18/109,779

(22) Filed: Feb. 14, 2023

(65) Prior Publication Data

US 2023/0334765 A1 Oct. 19, 2023

Related U.S. Application Data

(63) Continuation of application No. PCT/US2021/047576, filed on Aug. 25, 2021.

(60) Provisional application No. 63/070,089, filed on Aug. 25, 2020.

(51) Int. Cl.
*G06T 15/20* (2011.01)
*G06F 3/01* (2006.01)
*G06T 19/20* (2011.01)

(52) U.S. Cl.
CPC .............. *G06T 15/20* (2013.01); *G06F 3/013* (2013.01); *G06T 19/20* (2013.01); *G06T 2219/2016* (2013.01)

(58) Field of Classification Search
CPC ..................... G06T 15/20; G06T 19/20; G06T 2219/2016; G06F 3/013
See application file for complete search history.

(56) References Cited

U.S. PATENT DOCUMENTS

2019/0228588 A1  7/2019  Rockel et al.
2020/0209958 A1* 7/2020  Sztuk ..................... A63F 13/26

FOREIGN PATENT DOCUMENTS

WO  2019/142432 A1  7/2019

OTHER PUBLICATIONS

International Preliminary Report on Patentability received for PCT Patent Application No. PCT/US2021/047576, mailed on Mar. 9, 2023, 19 pages.
International Search Report and Written Opinion received for PCT Patent Application No. PCT/US2021/047576, mailed on Mar. 3, 2022, 23 pages.
Invitation to Pay Additional Fees received for PCT Patent Application No. PCT/US2021/047576, mailed on Jan. 3, 2022, 17 pages.

* cited by examiner

*Primary Examiner* — Grace Q Li
(74) *Attorney, Agent, or Firm* — DLA Piper LLP (US)

(57) ABSTRACT

In accordance with some embodiments, exemplary processes for changing (e.g., non-linearly) the size of a virtual object are described.

24 Claims, 13 Drawing Sheets

TECHNIQUES FOR RESIZING VIRTUAL OBJECTS

CROSS REFERENCE TO RELATED APPLICATIONS

This application is a continuation of PCT Application No. PCT/US2021/47576, entitled "TECHNIQUES FOR RESIZING VIRTUAL OBJECTS," filed Aug. 25, 2021, which claims priority to U.S. Provisional Application No. 63/070,089, entitled "TECHNIQUES FOR RESIZING VIRTUAL OBJECTS," filed Aug. 25, 2020, the contents of which are hereby incorporated by reference in their entireties for all purposes.

FIELD

The present disclosure generally relates to extended reality environments, and, more specifically, to methods and techniques for managing the display of virtual objects in extended reality environments.

BACKGROUND

Users often use devices to interact with extended reality environments. The use of devices is often limited by the battery life of the device. Thus, one or more techniques are needed to manage power usage to conserve battery life in devices.

BRIEF SUMMARY

In accordance with some embodiments, a method is performed at a system having one or more processors, memory, one or more image sensors, and a display device. The method includes: displaying, via the display device, a first virtual object having a first size, wherein a distance between a first location corresponding to a location of the first virtual object and a second location corresponding to a location of a viewpoint of the display device is between a first threshold distance and a second threshold distance that is less than the first threshold distance; while displaying the first virtual object having the first size and while the distance between the first location and the second location is between the first threshold distance and the second threshold distance, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is between the first threshold distance and the second threshold distance, maintaining display of the first virtual object having the first size, wherein the first virtual object having the first size is displayed while the changed distance between the first location and the second location is between the first threshold distance and the second threshold distance; and in accordance with a determination that a second set of criteria is satisfied, wherein the second set of criteria includes a criterion that is satisfied when the changed distance between the first location and the second location is between a third threshold distance and a fourth threshold distance that is greater than the third threshold distance: modifying the first virtual object to have a second size that is different from the first size; and displaying the first virtual object having the second size, wherein the first threshold distance is less than the third threshold distance, wherein the second threshold distance is less than the fourth threshold distance, and wherein the first virtual object is displayed having the second size while the changed distance between the first location and the second location is between the third threshold distance and the fourth threshold distance.

In accordance with some embodiments, a system includes a display device; one or more processors; and memory storing one or more programs configured to be executed by the one or more processors. The one or more programs include instructions for: displaying, via the display device, a first virtual object having a first size, wherein a distance between a first location corresponding to a location of the first virtual object and a second location corresponding to a location of a viewpoint of the display device is between a first threshold distance and a second threshold distance that is less than the first threshold distance; while displaying the first virtual object having the first size and while the distance between the first location and the second location is between the first threshold distance and the second threshold distance, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is between the first threshold distance and the second threshold distance, maintaining display of the first virtual object having the first size, wherein the first virtual object having the first size is displayed while the changed distance between the first location and the second location is between the first threshold distance and the second threshold distance; and in accordance with a determination that a second set of criteria is satisfied, wherein the second set of criteria includes a criterion that is satisfied when the changed distance between the first location and the second location is between a third threshold distance and a fourth threshold distance that is greater than the third threshold distance: modifying the first virtual object to have a second size that is different from the first size; and displaying the first virtual object having the second size, wherein the first threshold distance is less than the third threshold distance, wherein the second threshold distance is less than the fourth threshold distance, and wherein the first virtual object is displayed having the second size while the changed distance between the first location and the second location is between the third threshold distance and the fourth threshold distance.

In accordance with some embodiments, a non-transitory computer-readable storage medium stores one or more programs configured to be executed by one or more processors of a system device having a display device. The one or more programs include instructions for: displaying, via the display device, a first virtual object having a first size, wherein a distance between a first location corresponding to a location of the first virtual object and a second location corresponding to a location of a viewpoint of the display device is between a first threshold distance and a second threshold distance that is less than the first threshold distance; while displaying the first virtual object having the first size and while the distance between the first location and the second location is between the first threshold distance and the second threshold distance, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is between the first threshold distance and the second threshold distance, maintaining display of the first virtual object having the first size, wherein the first virtual object having the first size is displayed while the changed distance between the first location and the second location is between the first threshold distance and the second threshold distance; and in accordance with a determination that a second set of criteria is satisfied, wherein the second set of criteria includes a criterion that is satisfied when the changed distance between the first location and the second location is between a third threshold distance and a fourth threshold distance that is greater than the third threshold distance: modifying the first virtual object to have a second size that is different from the first size; and displaying the first virtual object having the second size, wherein the first threshold distance is less than the third threshold distance, wherein the second threshold distance is less than the fourth threshold distance, and wherein the first virtual object is displayed having the second size while the changed distance between the first location and the second location is between the third threshold distance and the fourth threshold distance.

In accordance with some embodiments, a transitory computer-readable storage medium stores one or more programs configured to be executed by one or more processors of a system device having a display device. The one or more programs include instructions for: displaying, via the display device, a first virtual object having a first size, wherein a distance between a first location corresponding to a location of the first virtual object and a second location corresponding to a location of a viewpoint of the display device is between a first threshold distance and a second threshold distance that is less than the first threshold distance; while displaying the first virtual object having the first size and while the distance between the first location and the second location is between the first threshold distance and the second threshold distance, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is between the first threshold distance and the second threshold distance, maintaining display of the first virtual object having the first size, wherein the first virtual object having the first size is displayed while the changed distance between the first location and the second location is between the first threshold distance and the second threshold distance; and in accordance with a determination that a second set of criteria is satisfied, wherein the second set of criteria includes a criterion that is satisfied when the changed distance between the first location and the second location is between a third threshold distance and a fourth threshold distance that is greater than the third threshold distance: modifying the first virtual object to have a second size that is different from the first size; and displaying the first virtual object having the second size, wherein the first threshold distance is less than the third threshold distance, wherein the second threshold distance is less than the fourth threshold distance, and wherein the first virtual object is displayed having the second size while the changed distance between the first location and the second location is between the third threshold distance and the fourth threshold distance.

In accordance with some embodiments, a system includes a display device; and one or more processors. The system includes means for displaying, via the display device, a first virtual object having a first size, wherein a distance between a first location corresponding to a location of the first virtual object and a second location corresponding to a location of a viewpoint of the display device is between a first threshold distance and a second threshold distance that is less than the first threshold distance; means, while displaying the first virtual object having the first size and while the distance between the first location and the second location is between the first threshold distance and the second threshold distance, for detecting a change in the distance between the first location and the second location; and means, responsive to detecting the change in the distance between the first location and the second location, for: in accordance with a determination that a first set of criteria is satisfied, wherein the first set of criteria includes a criterion that is satisfied when the changed distance between the first location and the second location is between the first threshold distance and the second threshold distance, maintaining display of the first virtual object having the first size, wherein the first virtual object having the first size is displayed while the changed distance between the first location and the second location is between the first threshold distance and the second threshold distance; and in accordance with a determination that a second set of criteria is satisfied, wherein the second set of criteria includes a criterion that is satisfied when the changed distance between the first location and the second location is between a third threshold distance and a fourth threshold distance that is greater than the third threshold distance: modifying the first virtual object to have a second size that is different from the first size; and displaying the first virtual object having the second size, wherein the first threshold distance is less than the third threshold distance, wherein the second threshold distance is less than the fourth threshold distance, and wherein the first virtual object is displayed having the second size while the changed distance between the first location and the second location is between the third threshold distance and the fourth threshold distance.

In accordance with some embodiments, a method is performed at a system having one or more processors, memory, one or more image sensors, and a display device. The method includes: displaying, via the display device, a first virtual object having a first size, wherein a distance between a first location corresponding to a location of the first virtual object and a second location corresponding to a location of a viewpoint of the display device is within a first set of continuous distances; while displaying the first virtual object having the first size and while the distance between the first location and the second location is within the first set of continuous distances, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is within the first set of continuous distances, maintaining display of the first virtual object having the first size, wherein the first virtual object having the first size is displayed while the changed distance between the first location and the second location is within the first set of continuous distances; and in accordance with a determination that a second set of criteria is satisfied, wherein the second set of criteria includes a criterion that is satisfied when the changed distance between the first location and the second location is within a second set of continuous distances, modifying the first virtual object to have a second size that is different from the first size and displaying the first virtual object having the second size, wherein the second set of continuous distances is different from the first set of continuous distances, and wherein the first virtual object is displayed having the second size while the changed distance between the first location and the second location is within the second set of continuous distances.

In accordance with some embodiments, a system includes a display device; one or more processors; and memory storing one or more programs configured to be executed by the one or more processors. The one or more programs include instructions for: displaying, via the display device, a first virtual object having a first size, wherein a distance between a first location corresponding to a location of the first virtual object and a second location corresponding to a location of a viewpoint of the display device is within a first set of continuous distances; while displaying the first virtual object having the first size and while the distance between the first location and the second location is within the first set of continuous distances, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is within the first set of continuous distances, maintaining display of the first virtual object having the first size, wherein the first virtual object having the first size is displayed while the changed distance between the first location and the second location is within the first set of continuous distances; and in accordance with a determination that a second set of criteria is satisfied, wherein the second set of criteria includes a criterion that is satisfied when the changed distance between the first location and the second location is within a second set of continuous distances, modifying the first virtual object to have a second size that is different from the first size and displaying the first virtual object having the second size, wherein the second set of continuous distances is different from the first set of continuous distances, and wherein the first virtual object is displayed having the second size while the changed distance between the first location and the second location is within the second set of continuous distances.

In accordance with some embodiments, a non-transitory computer-readable storage medium stores one or more programs configured to be executed by one or more processors of a system device having a display device. The one or more programs include instructions for: displaying, via the display device, a first virtual object having a first size, wherein a distance between a first location corresponding to a location of the first virtual object and a second location corresponding to a location of a viewpoint of the display device is within a first set of continuous distances; while displaying the first virtual object having the first size and while the distance between the first location and the second location is within the first set of continuous distances, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is within the first set of continuous distances, maintaining display of the first virtual object having the first size, wherein the first virtual object having the first size is displayed while the changed distance between the first location and the second location is within the first set of continuous distances; and in accordance with a determination that a second set of criteria is satisfied, wherein the second set of criteria includes a criterion that is satisfied when the changed distance between the first location and the second location is within a second set of continuous distances, modifying the first virtual object to have a second size that is different from the first size and displaying the first virtual object having the second size, wherein the second set of continuous distances is different from the first set of continuous distances, and wherein the first virtual object is displayed having the second size while the changed distance between the first location and the second location is within the second set of continuous distances.

In accordance with some embodiments, a transitory computer-readable storage medium stores one or more programs configured to be executed by one or more processors of a system device having a display device. The one or more programs include instructions for: displaying, via the display device, a first virtual object having a first size, wherein a distance between a first location corresponding to a location of the first virtual object and a second location corresponding to a location of a viewpoint of the display device is within a first set of continuous distances; while displaying the first virtual object having the first size and while the distance between the first location and the second location is within the first set of continuous distances, detecting a change in the distance between the first location and the second location; and in response to detecting the change in the distance between the first location and the second location: in accordance with a determination that a first set of criteria is satisfied, wherein the first set of criteria includes a criterion that is satisfied when the changed distance between the first location and the second location is within the first set of continuous distances, maintaining display of the first virtual object having the first size, wherein the first virtual object having the first size is displayed while the changed distance between the first location and the second location is within the first set of continuous distances; and in accordance with a determination that a second set of criteria is satisfied, wherein the second set of criteria includes a criterion that is satisfied when the changed distance between the first location and the second location is within a second set of continuous distances, modifying the first virtual object to have a second size that is different from the first size and displaying the first virtual object having the second size, wherein the second set of continuous distances is different from the first set of continuous distances, and wherein the first virtual object is displayed having the second size while the changed distance between the first location and the second location is within the second set of continuous distances.

In accordance with some embodiments, a system includes a display device; and one or more processors. The system includes means for displaying, via the display device, a first virtual object having a first size, wherein a distance between a first location corresponding to a location of the first virtual object and a second location corresponding to a location of a viewpoint of the display device is within a first set of continuous distances; means, while displaying the first virtual object having the first size and while the distance between the first location and the second location is within the first set of continuous distances, for detecting a change in the distance between the first location and the second location; and means, responsive to detecting the change in the distance between the first location and the second location, for: in accordance with a determination that a first set of criteria is satisfied, wherein the first set of criteria includes a criterion that is satisfied when the changed distance between the first location and the second location is within the first set of continuous distances, maintaining display of the first virtual object having the first size, wherein the first virtual object having the first size is displayed while the changed distance between the first location and the second location is within the first set of continuous distances; and in accordance with a determination that a second set of criteria is satisfied, wherein the second set of criteria includes a criterion that is satisfied when the changed distance between the first location and the second location is within a second set of continuous distances, modifying the first virtual object to have a second size that is different from the first size and displaying the first virtual object having the second size, wherein the second set of continuous distances is different from the first set of continuous distances, and wherein the first virtual object is displayed having the second size while the changed distance between the first location and the second location is within the second set of continuous distances.

In accordance with some embodiments, a method is performed at a system having one or more processors, memory, one or more image sensors, and a display device. The method includes: displaying, via the display device, a first virtual object, wherein the first virtual object has a first size and the first virtual object is located at a first position in an extended reality (XR) environment; and while displaying the first virtual object having the first size, detecting a request to change the first size of the virtual object. In response to detecting the request to change the first size of the virtual object, the method includes: in accordance with a determination that a first set of criteria is satisfied, wherein the first set of criteria includes a criterion that is satisfied when a determination is made that a detected gaze is directed away from the first position, modifying the first virtual object such that the first virtual object has a second size that is different from the first size; and in accordance with a determination that the first set of criteria is not satisfied, maintaining the first virtual object having the first size.

In accordance with some embodiments, a system includes a display device; one or more processors; and memory storing one or more programs configured to be executed by the one or more processors. The one or more programs include instructions for: displaying, via the display device, a first virtual object, wherein the first virtual object has a first size and the first virtual object is located at a first position in an extended reality (XR) environment; and while displaying the first virtual object having the first size, detecting a request to change the first size of the virtual object. In response to detecting the request to change the first size of the virtual object, the one or more programs include instructions for: in accordance with a determination that a first set of criteria is satisfied, wherein the first set of criteria includes a criterion that is satisfied when a determination is made that a detected gaze is directed away from the first position, modifying the first virtual object such that the first virtual object has a second size that is different from the first size; and in accordance with a determination that the first set of criteria is not satisfied, maintaining the first virtual object having the first size.

In accordance with some embodiments, a non-transitory computer-readable storage medium stores one or more programs configured to be executed by one or more processors of a system device having a display device. The one or more programs include instructions for: displaying, via the display device, a first virtual object, wherein the first virtual object has a first size and the first virtual object is located at a first position in an extended reality (XR) environment; and while displaying the first virtual object having the first size, detecting a request to change the first size of the virtual object. In response to detecting the request to change the first size of the virtual object, the one or more programs include instructions for: in accordance with a determination that a first set of criteria is satisfied, wherein the first set of criteria includes a criterion that is satisfied when a determination is made that a detected gaze is directed away from the first position, modifying the first virtual object such that the first virtual object has a second size that is different from the first size; and in accordance with a determination that the first set of criteria is not satisfied, maintaining the first virtual object having the first size.

In accordance with some embodiments, a transitory computer-readable storage medium stores one or more programs configured to be executed by one or more processors of a system device having a display device. The one or more programs include instructions for: displaying, via the display device, a first virtual object, wherein the first virtual object has a first size and the first virtual object is located at a first position in an extended reality (XR) environment; and while displaying the first virtual object having the first size, detecting a request to change the first size of the virtual object. In response to detecting the request to change the first size of the virtual object, the one or more programs include instructions for: in accordance with a determination that a first set of criteria is satisfied, wherein the first set of criteria includes a criterion that is satisfied when a determination is made that a detected gaze is directed away from the first position, modifying the first virtual object such that the first virtual object has a second size that is different from the first size; and in accordance with a determination that the first set of criteria is not satisfied, maintaining the first virtual object having the first size.

In accordance with some embodiments, a system includes a display device; memory; and one or more processors. The system includes means for displaying, via the display device, a first virtual object, wherein the first virtual object has a first size and the first virtual object is located at a first position in an extended reality (XR) environment; means, while displaying the first virtual object having the first size, for detecting a request to change the first size of the virtual object; and means, responsive to detecting the request to change the first size of the virtual object, for: in accordance with a determination that a first set of criteria is satisfied, wherein the first set of criteria includes a criterion that is satisfied when a determination is made that a detected gaze is directed away from the first position, modifying the first virtual object such that the first virtual object has a second size that is different from the first size; and in accordance with a determination that the first set of criteria is not satisfied, maintaining the first virtual object having the first size.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

BRIEF DESCRIPTION OF THE FIGURES

In the following description, reference is made to the accompanying figures which form a part thereof, and which illustrate several examples of the present disclosure. It is understood that other examples may be utilized and structural and operational changes may be made without departing from the scope of the present disclosure. The use of the same reference symbols in different figures indicates similar or identical items.

DESCRIPTION

Figure 1A:
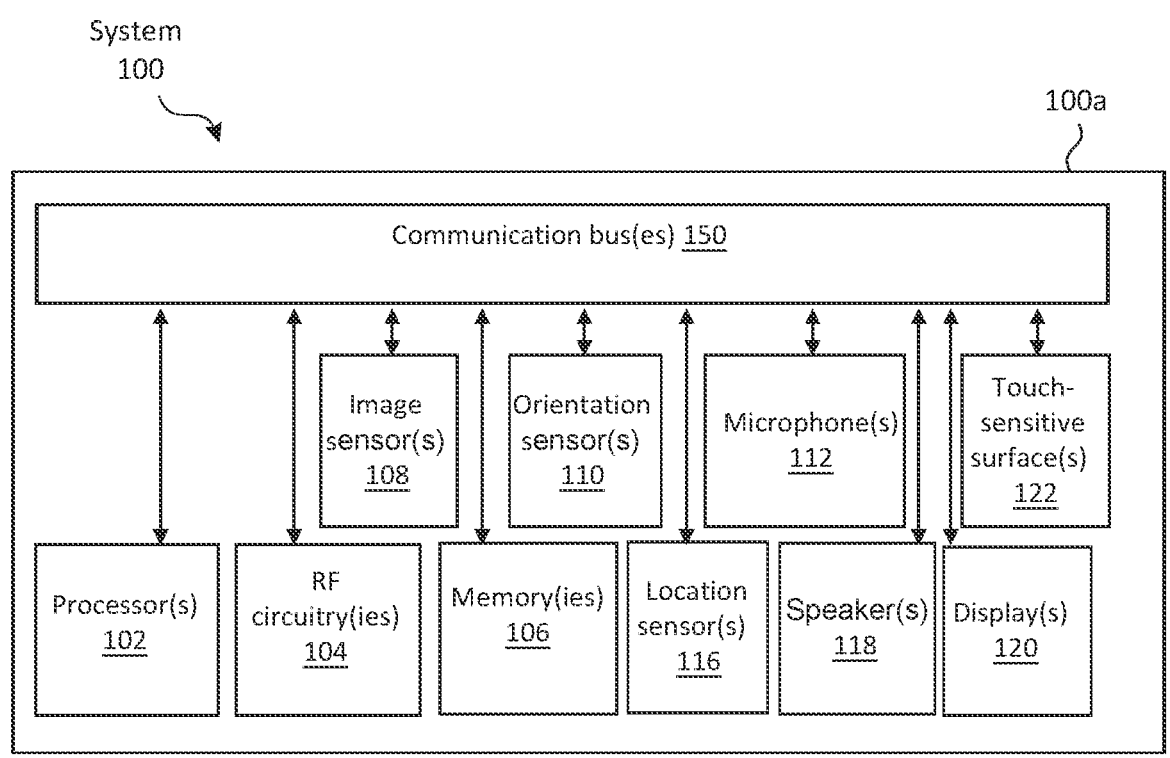
FIGS. 1A-1B depict exemplary systems for use in various extended reality technologies.

Various examples of electronic systems and techniques for using such systems in relation to various extended reality technologies are described.

A person can interact with and/or sense a physical environment or physical world without the aid of an electronic device. A physical environment can include physical features, such as a physical object or surface. An example of a physical environment is physical forest that includes physical plants and animals. A person can directly sense and/or interact with a physical environment through various means, such as hearing, sight, taste, touch, and smell.

In contrast, a person can use an electronic device to interact with and/or sense an extended reality (XR) environment that is wholly or partially simulated. The XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user similar to how such views and sounds would change in a physical environment. In another example, the XR system can detect movement of an electronic device that presents the XR environment (e.g., a mobile phone, tablet, laptop, or the like) and adjust graphical content and auditory content presented to the user similar to how such views and sounds would change in a physical environment. In some situations, the XR system can adjust characteristic(s) of graphical content in response to other inputs, such as a representation of a physical motion (e.g., a vocal command).

Many different types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface).

Figure 1B:
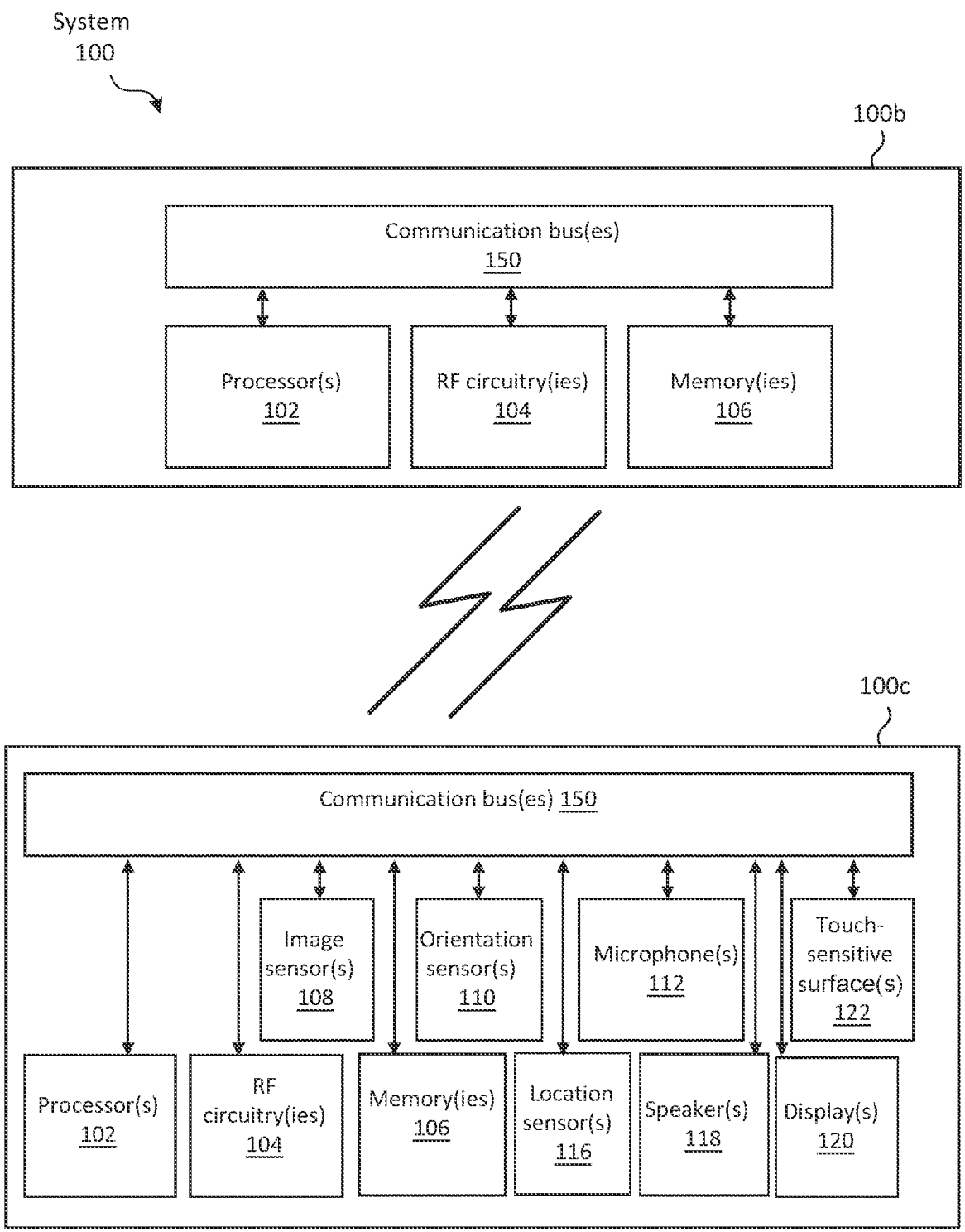

FIG. 1A and FIG. 1B depict exemplary system 100 for use in various extended reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or an HMD device.

As illustrated in FIG. 1B, in some examples, system 100 includes two (or more) devices in communication, such as through a wired connection or a wireless connection. First device 100*b* (e.g., a base station device) includes processor(s) 102, RF circuitry(ies) 104, and memory(ies) 106. These components optionally communicate over communication bus(es) 150 of device 100*b*. Second device 100*c* (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100*c*.

In some examples, system 100 is a mobile device. In some examples, system 100 is an HMD device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, the first display can include a plurality of other displays (e.g., sub-displays), such as a primary display and a secondary display. In some embodiments, the primary display has a different resolution than the secondary display when system 100 is operating. In some examples, display(s) 120 include a single display (e.g., first display or second display). In some examples, the single display includes a plurality of other displays (e.g., sub-displays), such as primary display and secondary display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensor(s) 108 optionally include one or more visible light image sensor(s), such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphone(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in the space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 2A-2B, 3A-3B, 4A-4B, 5A-5B, 6A-6B, 11, and 12 depict exemplary techniques for non-linearly resizing a virtual object in accordance with some embodiments. Notably, the techniques described in FIGS. 2A-2B, 3A-3B, 4A-4B, 5A-5B, 6A-6B, 11, and 12 can reduce visual distractions when resizing virtual objects using user interfaces in XR environments.

Figure 2A:
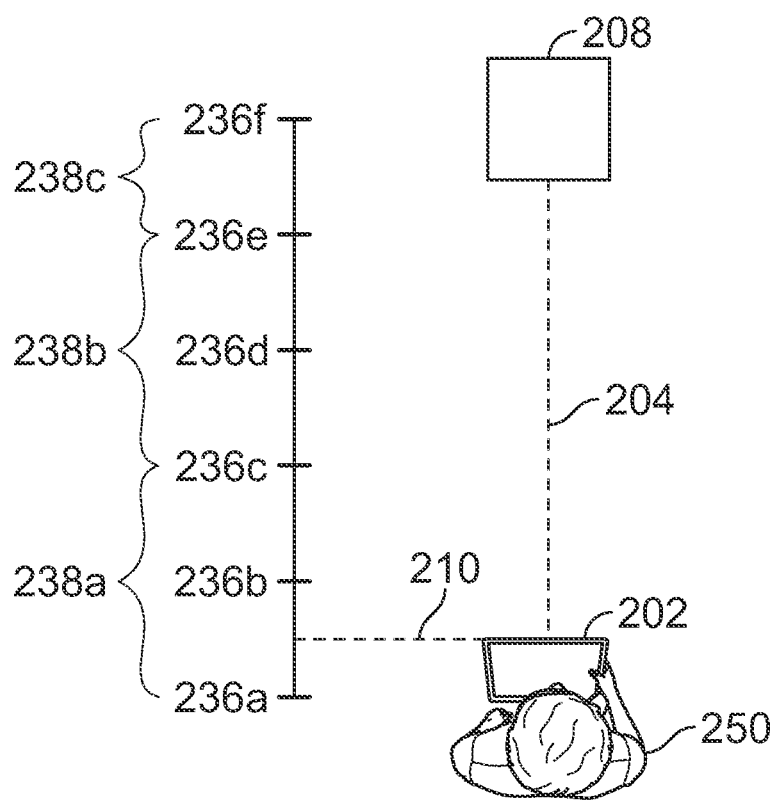
FIGS. 2A-2B depict an exemplary technique for non-linearly resizing a virtual object in accordance with some embodiments.

FIG. 2A illustrates an exemplary scenario where person 250 is standing at a location in an environment holding display device 202. In this scenario, person 250 can be standing at a physical location in a physical environment. In some embodiments, the physical location can have a corresponding virtual location within an XR environment.

Additionally, in this scenario, display device 202 is a tablet computer. In some embodiments, display device 202 can be another type of electronic device, such as a mobile phone, a personal computer, a television, a head-mounted display, etc. In some embodiments, display device 202 is a wearable device. In some embodiments, display device 202 can include one or more components of system 100, such as one or more processors (e.g., processor(s) 102), memories (e.g., memory(ies) 106), camera sensor(s) (e.g., image sensor(s) 108) or motion sensor(s) (e.g., orientation sensor(s) 110). For example, display device 202 can be an embodiment of device 100*a* of system 100 depicted in FIG. 1A.

Alternatively, in some embodiments, display device 202 can be an embodiment of second device 100c depicted in FIG. 1B.

In the scenario depicted in FIG. 2A, display device 202 (or another component of system 100) is configured to be able to modify (or initiate modification of) virtual objects, such as virtual object 208, in an XR environment. In some examples, the virtual object can be modified by changing an intrinsic property of the virtual object, such as its dimensions (e.g., in 3D space), color, mass, or the like.

As illustrated in FIG. 2A, a viewpoint of display device 202 is at a location (viewpoint location) that is distance 204 from a location of virtual object 208 (virtual object location) in an XR environment. In some embodiments, the viewpoint is at a location that corresponds to a location of a field-of-view of one or more cameras that are in communication with and/or are a part of display device 202.

In some embodiments, the viewpoint location and the virtual object location are virtual locations within an XR environment, and similarly, distance 204 is a virtual distance (e.g., a distance between two virtual locations).

In some embodiments, the viewpoint location and/or virtual object location can correspond to one or more physical locations in a physical environment, and distance 204 can correspond to a physical distance between the physical locations. In some embodiments, the physical locations are tracked by one or more components of display device 202 and are used to compute the viewpoint location, virtual object location, and/or distance 204. In some embodiments, distance 204 can be a multiple of a corresponding physical distance, or vice-versa.

In FIG. 2A, object 208 is a virtual whiteboard. In some embodiments, the virtual whiteboard has one or more words or symbols on it. As discussed in greater detail below, in some examples, the size of object 208 can be changed and the size of the one or more words or symbols can similarly be changed by an amount proportional to the change in size of object 208. For example, when the size of object 208 increases, the size of the words or symbols on object 208 increases to a size that is proportional to the increased size of object 208, or vice-versa.

In some embodiments, the virtual whiteboard can correspond to a physical object in a physical environment. For example, the virtual whiteboard can be a virtual object that corresponds to a physical whiteboard.

It should be also recognized that object 208 could be any type of object. Object 208 can be any type of virtual structure or virtual article and, in some embodiments, can correspond to any type of a physical structure or physical article that is/was within a physical environment.

FIG. 2A further illustrates distances 236a-236f ordered from largest (e.g., distance 236a) to smallest (e.g., distance 236f). Similar to distance 204, distances 236a-236f can correspond to (or be) physical distances in some embodiments.

Each of distances 236a-236f is a respective distance away from the virtual object location. In some embodiments, when the viewpoint location is at a location in the environment that is aligned with distance 236f, the viewpoint location is at the virtual object location or, in other words, distance 236f is equal to zero.

As depicted in FIG. 2A, distances 236a-236f are grouped in sets of continuous distances 238a-238c. In some embodiments, sets of continuous distances 238a-238c correspond to one or more sets of physical continuous distances similar to those described above in relation to distances 236a-236f. In some embodiments, the sets of continuous distances are alternatively sets of contiguous distances. In some embodiments, a set of continuous distances is a set of distances that are defined (e.g., programmatically and/or theoretically) by not having a discreet boundary between each distance in the set of distances. In some embodiments, a set of contiguous distances is a set of distances that are defined (e.g., programmatically and/or theoretically) by having a discreet boundary between each distance in the set of distances (e.g., includes multiple sets of continuous distances where at least one of the sets of continuous distances share a boundary). In some embodiments, a set of continuous distances covering a range of 10 meters can include the distances between 1-10 meters while a set of contiguous distances covering a range of 10 meters can include distances between 1-3 meters, 3-6 meters, 7-8 meters, and 8-10 meters.

Set of continuous distances 238a includes all distances that are less than or equal to distance 236a (e.g., a maximum distance value, a non-zero threshold distance, and/or endpoint) and greater than distance 236c (e.g., a minimum distance value, a threshold distance, and/or endpoint) between the viewpoint location and the virtual object location. Set of continuous distances 238b includes all distances that are less than or equal to distance 236c and greater than distance 236e (e.g., a maximum distance value, a non-zero threshold distance, and/or endpoint) between the viewpoint location and the virtual object location. Set of continuous distances 238c includes all distances that are less or equal to than distance 236e and greater than distance 236f (e.g., a maximum distance value, a non-zero threshold distance, and/or endpoint) between the viewpoint location and the virtual object location.

In some embodiments, two or more of the sets of continuous distances are neighboring sets of continuous distances. For example, sets of continuous distances 238a and 238b are neighboring sets of continuous distances, but sets of continuous distances 238a and 238c are not neighboring sets of continuous distances because they are separated by set of continuous distances 238b. In some embodiments, one or more other sets of continuous distances exist between the viewpoint location and the virtual object location. In some embodiments, a different set of continuous distances is between two of more of sets of continuous distances 238a, 238b, and 238c.

As illustrated in FIG. 2A, the viewpoint location is within set of continuous distances 238a from the virtual object location (as shown by dotted line 210). In other words, distance 204 is within set of continuous distances 238a while the viewpoint location is distance 204 from the virtual object location.

As illustrated in FIG. 2A, virtual object 208 has a first size. In some embodiments, the size of a virtual object can include the virtual object's length, width, height, perimeter, area, volume, etc.

In some embodiments, one or more virtual objects (other virtual objects) are adjacent to virtual object 208 or at any other locations in the environment. In some embodiments, sets of continuous distances 238a-238c are associated with (e.g., configured to change based on) a set of the other virtual objects while another set of continuous distances are associated with another set of the other virtual objects.

In some embodiments, the other virtual objects are at a virtual location such that the viewpoint location is also distance 204 from the virtual location of the other virtual objects. In some embodiments, the sizes of the other virtual objects are different from or the same as the size of virtual object 208.

In some embodiments, at least one of the other virtual objects is within a set of continuous distances, including sets of continuous distances 238a-238c.

Figure 2B:
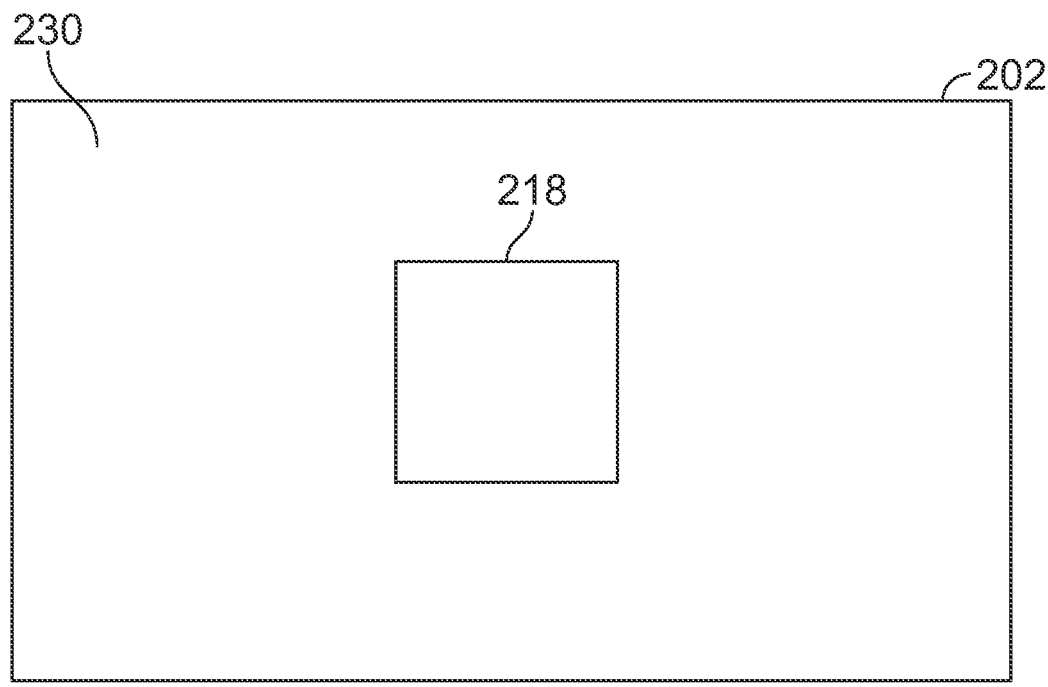

FIG. 2B illustrates an exemplary display screen 230 of display device 202 at a time that corresponds to the scenario depicted in FIG. 2A. As depicted in FIG. 2B, an XR environment is shown on display screen 230.

In some embodiments, the XR environment includes representation 218 of virtual object 208. As depicted in FIG. 2B, representation 218 is a representation of virtual object 208 in FIG. 2A. In some embodiments, representation 218 appears at a depth in the XR environment that corresponds to distance 204 in FIG. 2A.

As illustrated in FIG. 2B, display device 202 displays representation 218 at a size within display screen 230 that corresponds to the size of virtual object 208 while the viewpoint location is distance 204 from the virtual object location.

In some embodiments, at FIG. 2B, the display device 202 displays representations of one or more virtual objects in the XR environment based on the size of the one or more virtual objects and/or the distance between the viewpoint location and the location of each respective virtual object.

Figure 3A:
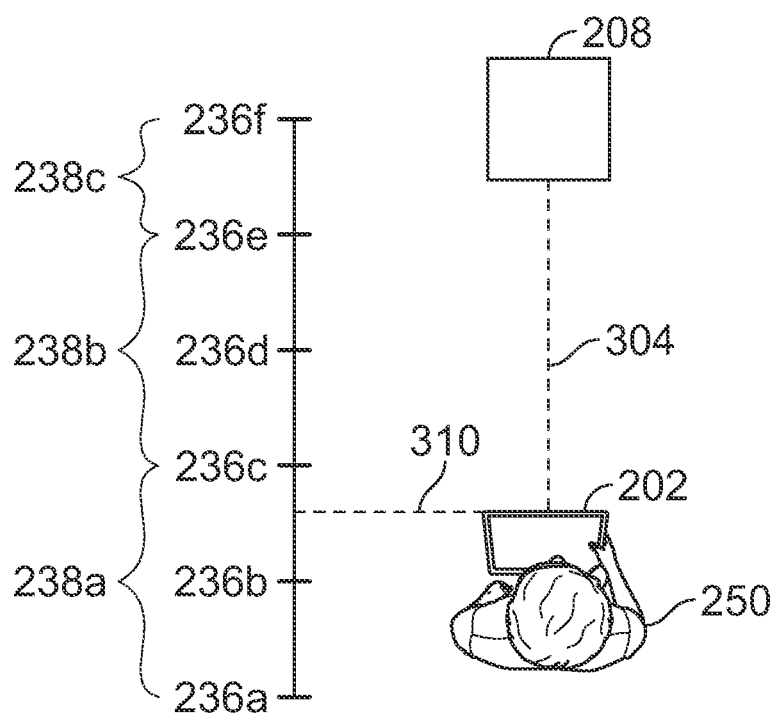
FIGS. 3A-3B depict an exemplary technique for non-linearly resizing a virtual object in accordance with some embodiments.

FIG. 3A illustrates an exemplary scenario where person 250 has moved to a different (physical or virtual) location in the environment. As depicted in FIG. 3A, the viewpoint location is distance 304 away from the virtual object location. While distance 304 in FIG. 3A is a smaller distance than distance 204 in FIG. 2A, distance 304 continues to remain within (e.g., shown by dotted line 310) set of continuous distances 238a.

Figure 3B:
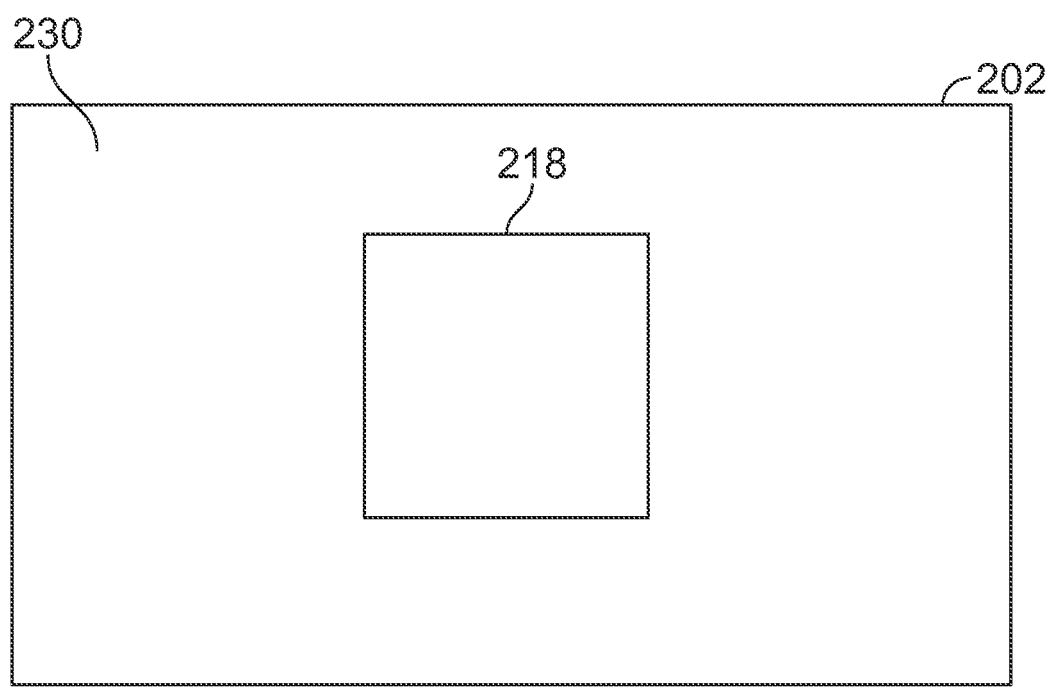

FIG. 3B illustrates display screen 230 at a time that corresponds to the scenario depicted in FIG. 3A. Assume that in FIG. 3A, display device 202 (or another component of system 100) detects a change in distance (e.g., from distance 204 in FIG. 2A to distance 304 in FIG. 3A) between the viewpoint location and the virtual object location. In response to detecting the change in distance, display device 202 determines that virtual object 208 should not be resized and, based on this determination, maintains the size of virtual object 208. In some embodiments, display device 202 determines that the size of virtual object 208 should not be resized because distance 304 is (or has remained) within set of continuous distances 238a.

Notably, with reference to FIGS. 2A and 3A the size of virtual object 208 is maintained although the distance between the viewpoint location and the virtual object location has decreased. This is at least because display device 202 does not linearly or continuously change the size of some virtual objects based on a particular distance (or the exact distance) between the viewpoint location and the virtual object location.

In FIG. 3B, display device 202 increases the size of representation 218 to represent virtual object 208 from the perspective of the viewpoint of display device 202. Here, the size of representation 218 increases relative to the size of representation 218 FIG. 2B because person 250 is standing closer (in FIG. 3A than in FIG. 2A) to a virtual object that has not changed size.

Figure 4A:
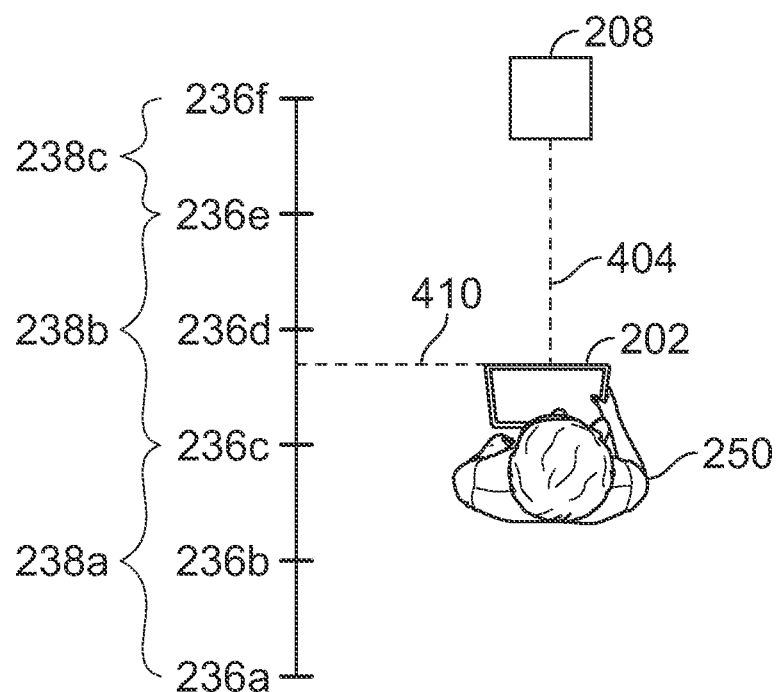
FIGS. 4A-4B depict an exemplary technique for non-linearly resizing a virtual object in accordance with some embodiments.

FIG. 4A illustrates an exemplary scenario where person 250 has moved to a different location in the environment. As depicted in FIG. 4A, the viewpoint location is distance 404 away from the virtual object location. With reference to FIGS. 3A and 4A, the viewpoint location is closer to the virtual object location in FIG. 4A because distance 404 is a smaller distance than distance 304 in FIG. 3A. In addition, as depicted in FIG. 4A, the distance between viewpoint location and the virtual object location is within a new set of continuous distances. For example, in FIG. 4A, distance 404 is within set of continuous distances 238b while distance 304 was within set of continuous distances 238a in FIG. 3A.

Assume that in FIG. 4A, display device 202 (or another component of system 100) detects a change in distance (e.g., from distance 304 in FIG. 3A to distance 404 in FIG. 4A) between the viewpoint location and the virtual object location. In response to detecting the change in distance, display device 202 determines that virtual object 208 should be resized and, based on this determination, changes the size of virtual object 208. For example, in FIG. 4A, virtual object 208 is smaller in FIG. 4A than it was in FIG. 3A.

In some embodiments, display device 202 makes the determination that virtual object 208 should be resized because distance 404 is within a new set of continuous distances (e.g., set of continuous distances 238b instead of set of continuous distances 238a).

As discussed above in relation to FIGS. 2A and 3A, display device 202 does not linearly or continuously change the size of some virtual objects based on a particular distance (or the exact distance) between the viewpoint location and the virtual object location. However, as shown in FIGS. 2A, 3A, and 4A, display device 202 non-linearly changes the sizes of the virtual objects based on whether the distance between the viewpoint and virtual object 208 is within a particular set of continuous distances. Thus, in some embodiments, the size of the virtual object changes relative to the set of continuous distances rather than the particular distance between the viewpoint location and the virtual object location. In some embodiments, non-linearly changing the sizes of the virtual objects reduces the number of operations (e.g., changing/updating the display) that display device 202 has to make to update its display, which saves battery life of display device 202. Additionally, changing the size of virtual objects (e.g., virtual object 208) can be done to maintain the size of its representation (e.g., representation 218) on a display device within a desirable range. For example, decreasing the size of virtual object 208 in FIG. 4A can prevent its representation 218 in FIG. 4B from occupying an undesirably large amount of the display. Similarly, increasing the size of virtual object 208 in response to the distance between display device 202 and virtual object 208 increasing can prevent its representation 218 from being displayed at an undesirably small size (e.g., text that is too small to read).

In some embodiments, a second virtual object is adjacent to virtual object 208. In some embodiments, display device 202 does not (e.g., forgoes to) resize the second virtual object even when the second virtual object is at the same distance away from the viewpoint location as virtual object 208.

In some embodiments, display device 202 does not resize the second virtual object because the second virtual object is not a type of object that is configured to be resized. For example, certain types of objects are not resizable, such as objects configured not to be resized by one or more settings, parameters, processes, applications, etc. In some embodiments, certain types of virtual objects are not resizable because they have one or more characteristics or features that are suitable for the types of virtual objects to remain the same size. In some embodiments, one or more applications and/or processes in communication with display device 202 may determine that an object is not suitable to be resized because it has one or more features, such as text, a user interface element type (e.g., an icon, input box, field selector), a color, and/or a minimum display resolution, etc., where resizing the object would distort the object and/or potentially cause less user interaction with the object.

In some embodiments, display device 202 does not resize the second virtual object because it is not associated with one or more of sets of continuous distances 238a-238b.

In some embodiments, display device 202 does not resize the second virtual object because it has previously been resized a predetermined number of allowable times (e.g., once, twice, etc.). In some embodiments, display device 202 does not resize the second virtual object because it has previously been resized a predetermined number of allowable times after a representation of it was displayed in the XR environment during a session of displaying the XR environment or detecting user activity associated with the XR environment, such as an interaction with the representation of the second virtual object in the XR environment.

In some embodiments, display device 202 does not resize the second virtual object because it is an object that takes more battery power to resize or update. For example, the second virtual object can take more battery power to resize or update when it is an object that requires a higher resolution to be displayed at enlarged or smaller sizes, an object that exceeds a maximum resizing resolution, an object that requires a higher resolution to be displayed than concurrently displayed objects, and/or an object that requires one or more processes to be performed before resizing or updating information displayed by the object.

Figure 4B:
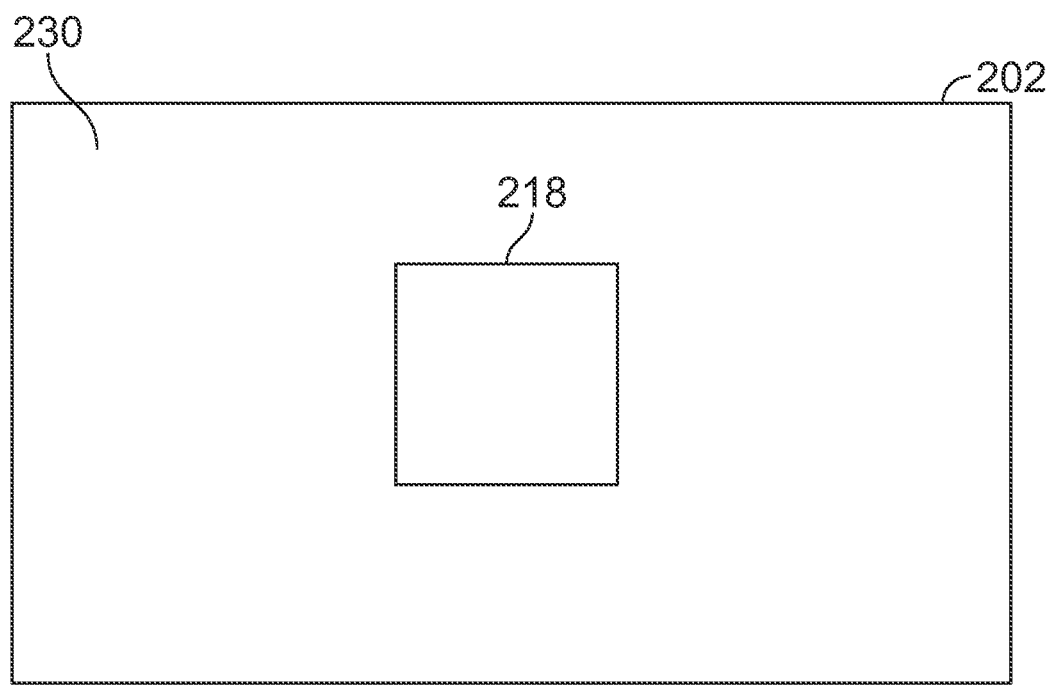

FIG. 4B illustrates display screen 230 at a time that corresponds to the scenario depicted in FIG. 4A. In FIG. 4B, display device 202 decreases the size of representation 218 to represent virtual object 208 from the perspective of the viewpoint of display device 202. Here, the size of representation 218 decreases because the size of virtual object 208 has decreased even though person 250 is standing closer (in FIG. 4A than in FIG. 3A) to virtual object 208. However, in other examples, representation 218 can appear at the same or a larger size than shown in FIG. 3A depending on the amount that the virtual object 208 is reduced in size relative to the amount of change in distance between display device 202 and the virtual object 208. In some embodiments, the size of virtual object 208 can be changed such that its representation 218 in FIG. 4B is the same as its size FIG. 2B.

Figure 5A:
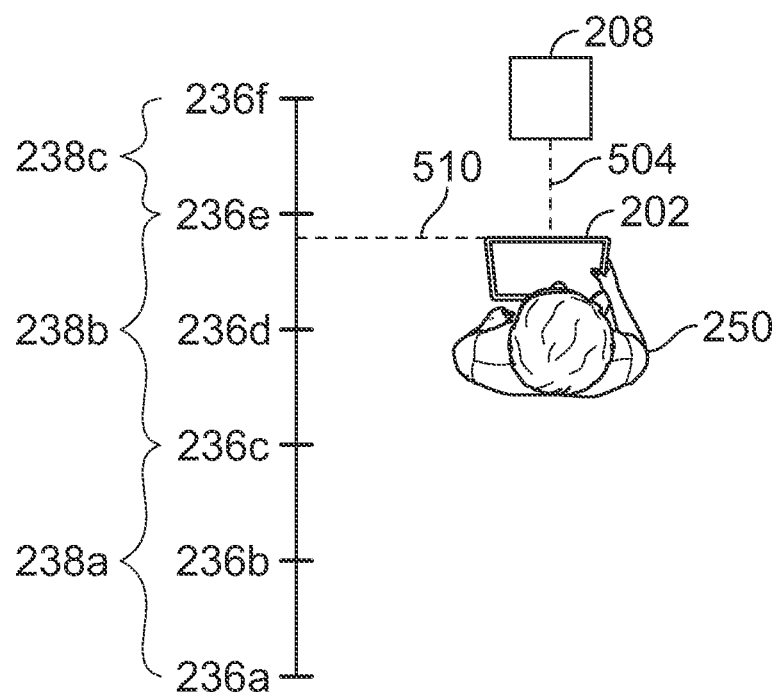
FIGS. 5A-5B depict an exemplary technique for non-linearly resizing a virtual object in accordance with some embodiments.

FIG. 5A illustrates an exemplary scenario where person 250 has moved to a different location in the environment. With reference to FIGS. 4A and 5A, the viewpoint location is closer to the virtual object location in FIG. 5A because distance 504 is a smaller distance than distance 404 in FIG. 4A. While distance 504 is a smaller distance than distance 404, distance 504 continues to remain within (e.g., shown by dotted line 510) set of continuous distances 238b, as distance 404 was between set of continuous distances 238b in FIG. 4A.

Assume that in FIG. 5A, display device 202 (or another component of system 100) detects a change in distance (e.g., from distance 404 in FIG. 4A to distance 504 in FIG. 5A) between the viewpoint location and the virtual object location. In response to detecting the change in distance, display device 202 determines that virtual object 208 should not be resized and, based on this determination, maintains the size of virtual object 208. Display device 202 maintains the size of virtual object 208 while distance 504 continues to remain within set of continuous distances 238b. In some embodiments, display 202 uses similar techniques at FIG. 5A to those discussed above in relation to FIG. 3A.

Figure 5B:
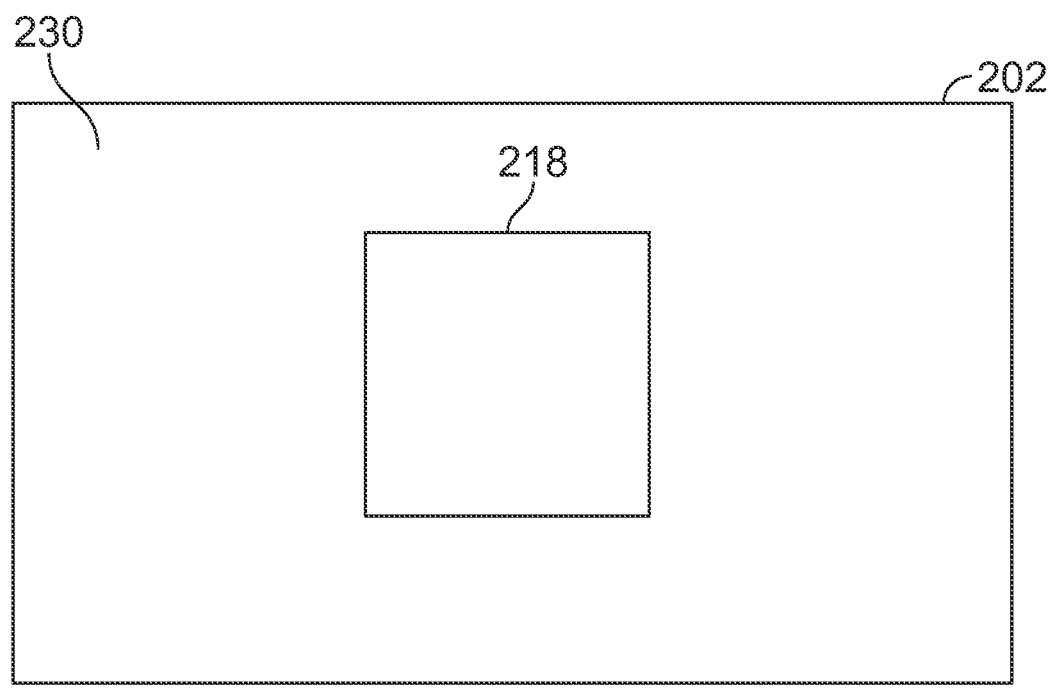

FIG. 5B illustrates display screen 230 at a time that corresponds to the scenario depicted in FIG. 5A. In FIG. 5B, display device 202 increases the size of representation 218 to represent virtual object 208 from the perspective of the viewpoint of display device 202. Here, the size of representation 218 increases because person 250 is standing closer (in FIG. 5A than in FIG. 4A) to a virtual object that has not changed size in FIG. 5A. In some embodiments, display 202 uses similar techniques at FIG. 5B to those discussed above in relation to FIG. 3B.

With reference to FIGS. 2B, 3B, 4B, and 5B, by changing the size of the virtual object 208 as described herein, display device 202 is able to simulate the size of representation 218 changing within a set of continuous distance as the display device 202 moves while also maintaining representation 218 on the display, irrespective of the distance between the viewpoint location and the virtual object location. In some embodiments, the size of virtual object 208 is adjusted such that representation 218 is maintained on the display when the entirety of representation 218 is shown and/or a representation of all portions of virtual object 208 is displayed without any of the portions of virtual 208 being clipped by an edge of display screen 230 (or visually represented as being past (or intersecting with) one or more edges of display screen 230).

In some embodiments, non-linearly changing the sizes of the virtual objects reduces visual distractions (or the number of objects moving) on display device 202. In some embodiments, non-linearly changing the sizes of the virtual objects reduces an effect of an object appearing to move away from a user, which can take place when a virtual object is continuously resized. In some embodiments, non-linearly changing the sizes of the virtual objects reduces an effect of an object appearing to move away, which can take place when a virtual object is continuously resized.

Figure 6A:
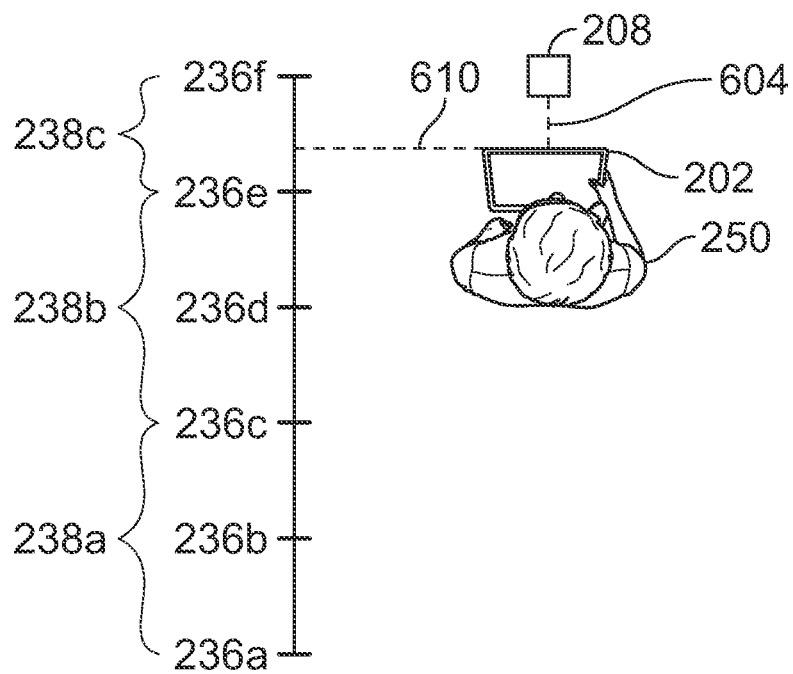
FIGS. 6A-6B depict an exemplary technique for non-linearly resizing a virtual object in accordance with some embodiments.

FIG. 6A illustrates an exemplary scenario where person 250 has moved to a different location in the environment. As depicted in FIG. 6A, the viewpoint location is distance 604 away from the virtual object location. With reference to FIGS. 5A and 6A, the viewpoint location is closer to the virtual object location in FIG. 6A because distance 604 is a smaller distance than distance 504 in FIG. 5A. In addition, as depicted in FIG. 6A, the distance between viewpoint location and the virtual object location is within a new set of continuous distances. For example, in FIG. 6A, distance 604 is within set of continuous distances 238c while distance 504 was within set of continuous distances 238b in FIG. 5A.

Assume that in FIG. 6A, display device 202 (or another component of system 100) detects a change in distance (e.g., from distance 504 in FIG. 5A to distance 604 in FIG. 6A) between the viewpoint location and the virtual object location. In response to detecting the change in distance, display device 202 determines that virtual object 208 should be resized and, based on this determination, changes the size of virtual object 208. For example, virtual object 208 is smaller in FIG. 6A than it was in FIG. 5A. In some embodiments, display 202 uses similar techniques at FIG. 6A to those discussed above in relation to FIG. 4A.

Figure 6B:
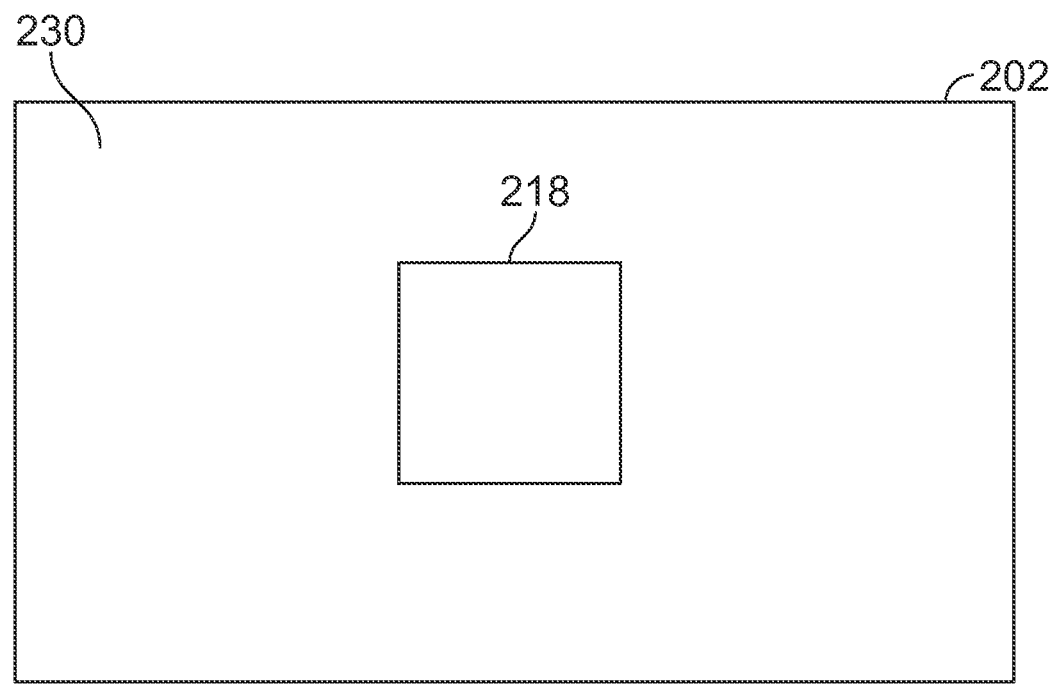

FIG. 6B illustrates display screen 230 at a time that corresponds to the scenario depicted in FIG. 6A. In FIG. 6B, display device 202 decreases the size of representation 218 to represent virtual object 208 from the perspective of the viewpoint of display device 202. Here, the size of representation 218 decreases because the size of virtual object 208 has decreased even though person 250 is standing closer (in FIG. 6A than in FIG. 5A) to virtual object 208. However, in other examples, representation 218 can appear at the same or a larger size than shown in FIG. 5A depending on the amount that the virtual object 208 is reduced in size relative to the amount of change in distance between display device 202 and the virtual object 208. In some embodiments, the size of virtual object 208 can be changed such that its representation 218 in FIG. 6B is the same size of representation 218 in FIGS. 2B and 4B. In some embodiments, display 202 uses similar techniques at FIG. 6B to those discussed above in relation to FIG. 4B.

FIGS. 7A-7B, 8A-8B, 9A-9B, 10A-10B, 11, and 12 depict exemplary techniques for non-linearly resizing a virtual object in accordance with some embodiments. FIGS. 7A, 8A, 9A, and 10A illustrate one or more components (e.g., the virtual object location, object 208, distances 236a-236f, sets of continuous distances 238a-238c), as described above in relation to FIG. 2A.

Notably, in FIGS. 7A-7B, 8A-8B, 9A-9B, 10A-10B, 11, and 12, the techniques described can reduce distractions of modifying virtual objects in an XR environment. For simplicity, FIGS. 7A-7B, 8A-8B, 9A-9B, and 10A-10B describe one or more techniques where display device 202 (or another component of system 100) changes (or does not change) the size of a virtual object based on whether display device 202 detects that person 250 is looking at the virtual object and the distance that viewpoint is away from the location corresponding to the virtual object location. However, in some embodiments, techniques may be deployed where display device 202 changes (does not change) the size of a virtual object based on whether a user is looking at a virtual object irrespective of the distance that the viewpoint location is away from the virtual object location.

Figure 7A:
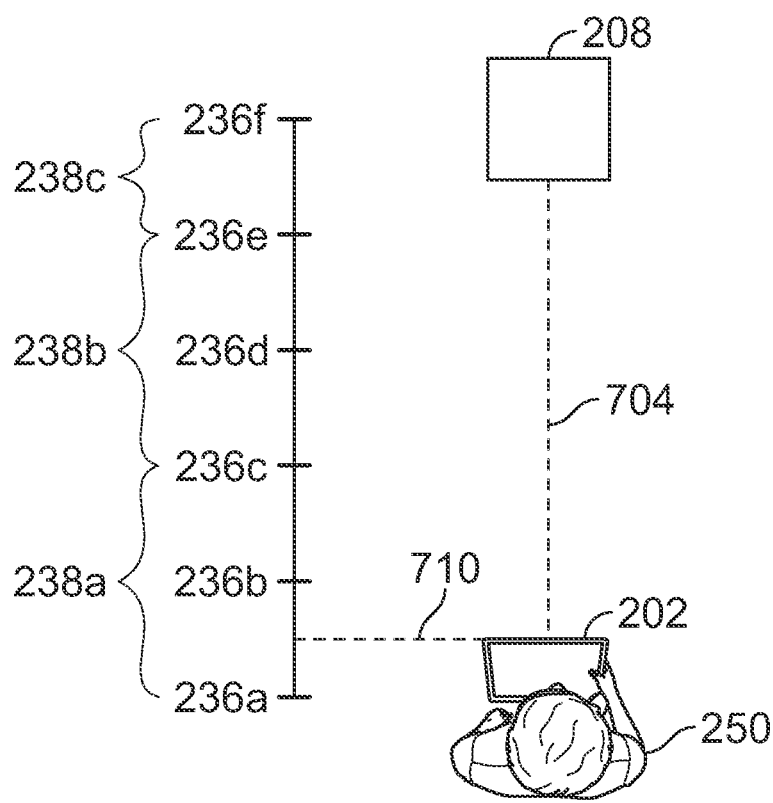
FIGS. 7A-7B depict an exemplary technique for non-linearly resizing a virtual object in accordance with some embodiments.

FIG. 7A illustrates an exemplary scenario where person 250 is holding display device 202 at a location in an environment. As illustrated in FIG. 7A, the viewpoint location is distance 704 away from the virtual object location.

As illustrated in FIG. 7A, while the viewpoint location is distance 704 from the virtual object location, the viewpoint location is also within (e.g., shown by dotted line 710) set of continuous distances 238a from the virtual object location. In other words, distance 704 is within set of continuous distances 238a.

Figure 7B:
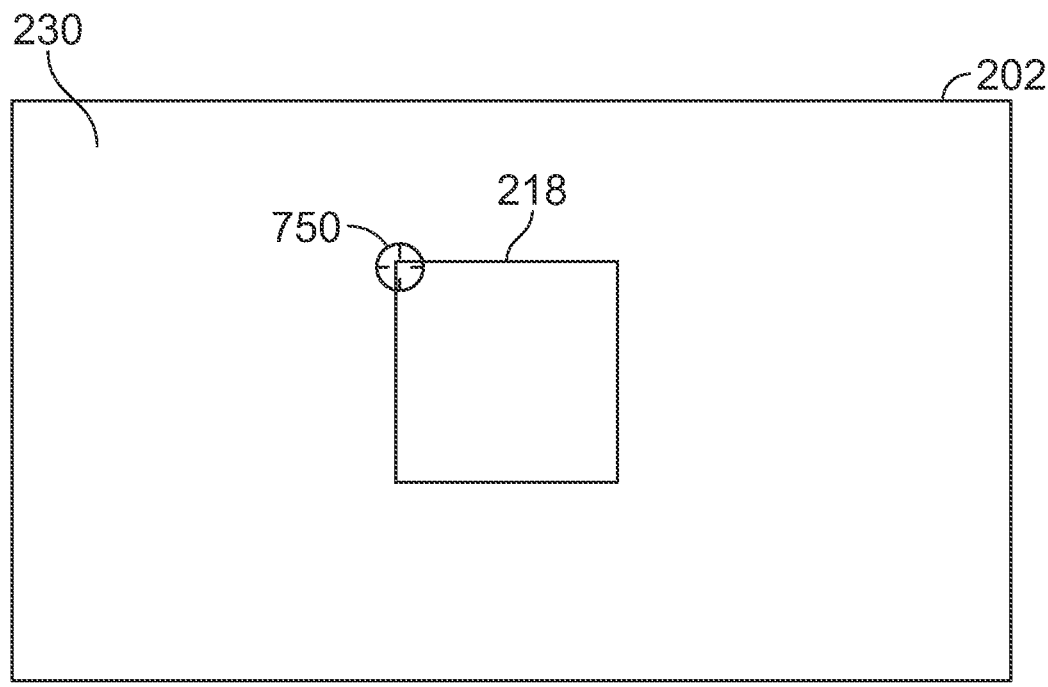

FIG. 7B illustrates display screen 230 of display device 202 at a time that corresponds to the scenario depicted in FIG. 7A. In some embodiments, as depicted in FIG. 7B, display device 202 displays an XR environment on display screen 230 using similar techniques to those described above in relation to FIG. 2B.

In FIG. 7B, a representation of a detected gaze position 750 (or a detected gaze position 750 of person 250) is positioned on display screen 230 at a location that corresponds to a location in the XR environment. Detected gaze position 750 is shown in FIG. 7B on display screen 230 for illustrative purposes only and can or cannot be actually displayed on display screen 230.

Figure 8A:
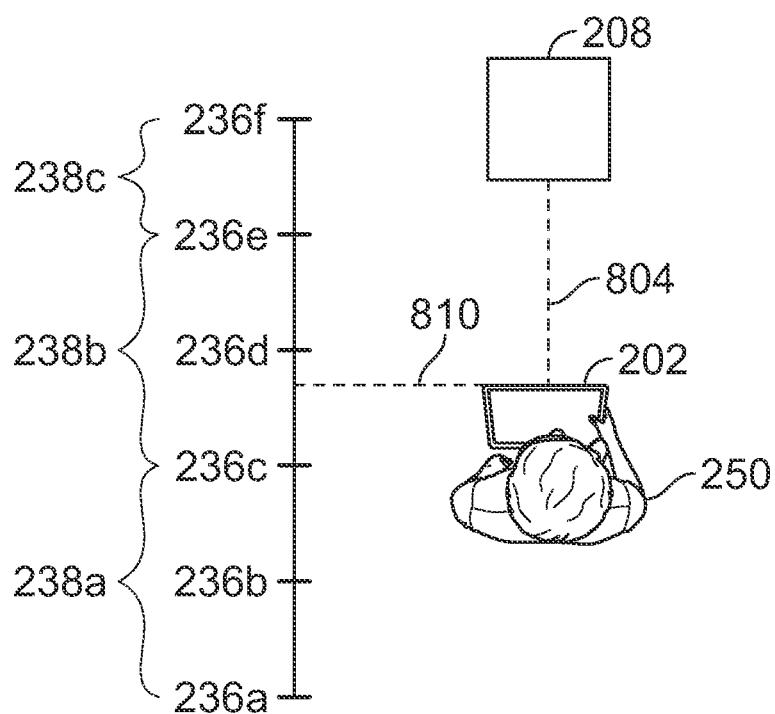
FIGS. 8A-8B depict an exemplary technique for non-linearly resizing a virtual object in accordance with some embodiments.

FIG. 8A illustrates person 250 in an exemplary scenario where person 250 has moved to a different location in the environment. As depicted in FIG. 8A, the viewpoint location is distance 804 away from the virtual object location. With reference to FIGS. 7A and 8A, the viewpoint location is closer to the virtual object location in FIG. 8A because distance 804 is a smaller distance than distance 704 in FIG. 7A. In some embodiments, distance 804 is equal to distance 404.

In some embodiments, as depicted in FIG. 8A, the distance between viewpoint location and the virtual object location is within a new set of continuous distances. For example, in FIG. 8A, distance 804 is within set of continuous distances 238b while distance 704 was within set of continuous distances 238a in FIG. 7A.

Figure 8B:
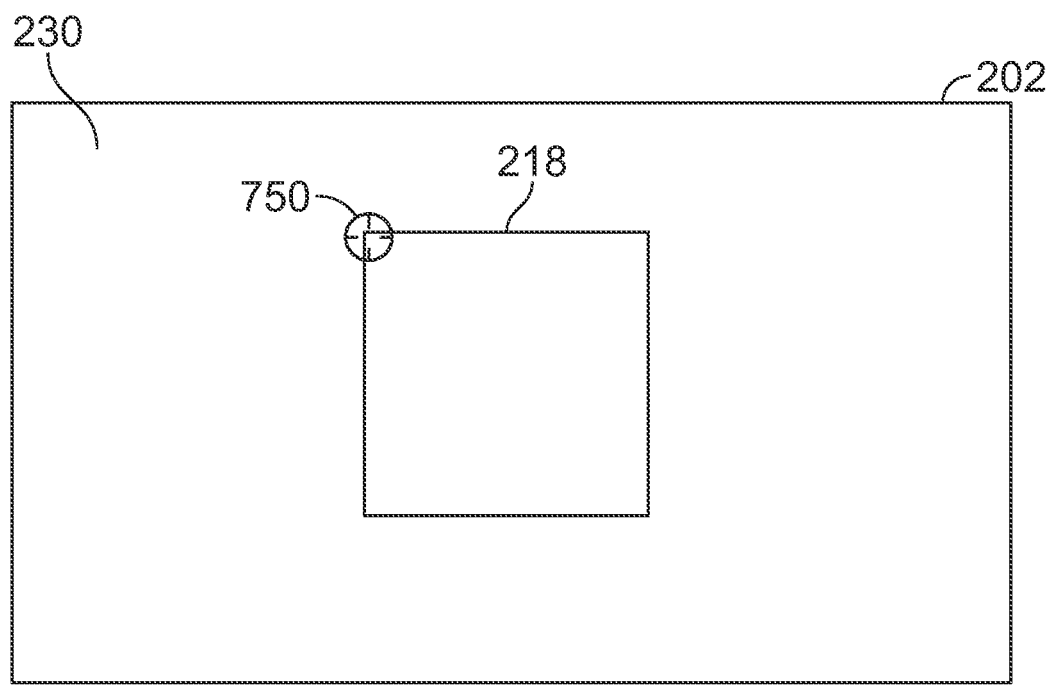

FIG. 8B illustrates display screen 230 at a time that corresponds to the scenario depicted in FIG. 8A.

With reference to FIGS. 8A-8B, Assume that display device 202 receives information corresponding to detected gaze position 750. In response to receiving information corresponding to detected gaze position 750, display device 202 (or any other component of system 100) determines that detected gaze position 750 is within a predetermined threshold distance from the virtual object location or within a predetermined threshold distance in screen space on display screen 230 from representation 218. In some embodiments, display device 202 maintains the size of virtual object 208 because of this determination, as shown in FIG. 8A.

In some embodiments, display device 202 receives information corresponding to the detected gaze position and/or determinations whether the detected gaze position is within a predetermined threshold distance of virtual object 208 in response to detecting a change in distance between the viewpoint location and the virtual object location.

In some embodiments, the actions of display device 202, with reference to FIGS. 4A-4B, are different from the actions of display device 202, with reference to FIG. 8A-8B, although the distance from the viewpoint location and the virtual object location is within the same set of continuous distances. Looking back at FIG. 4A, display device 202 enlarged virtual object 208 when distance 404 was between set of continuous distances 238b. However, in FIG. 8A, the size of virtual object 208 is maintained because the detected gaze position is within a predetermined threshold distance of virtual object 208. In some embodiments, display device 202 determines that person 250 is looking at virtual object 208 when the gaze position is within a predetermined threshold distance of virtual object 208.

In some embodiments, display device 202 changes the size of other virtual objects while maintaining the size of virtual object 208. In some embodiments, display device 202 changes the size of the other virtual object based on a determination that detected gaze position 750 is not within a predetermined threshold distance of a location that corresponds to at least one of the other virtual objects. In some embodiments, display device 202 determines that person 250 is looking away from at least one of the other virtual objects when the gaze position is not within a predetermined threshold distance of a location that corresponds to the virtual object.

Turning back to FIG. 8B, display device 202 increases the size of representation 218. In FIG. 8B, display device 202 increases the size of representation 218 to represent virtual object 208 from the perspective of the viewpoint of display device 202. Here, the size of representation 218 increases because person 250 is standing closer (in FIG. 8A than in FIG. 7A) to a virtual object that has not changed size.

Figure 9A:
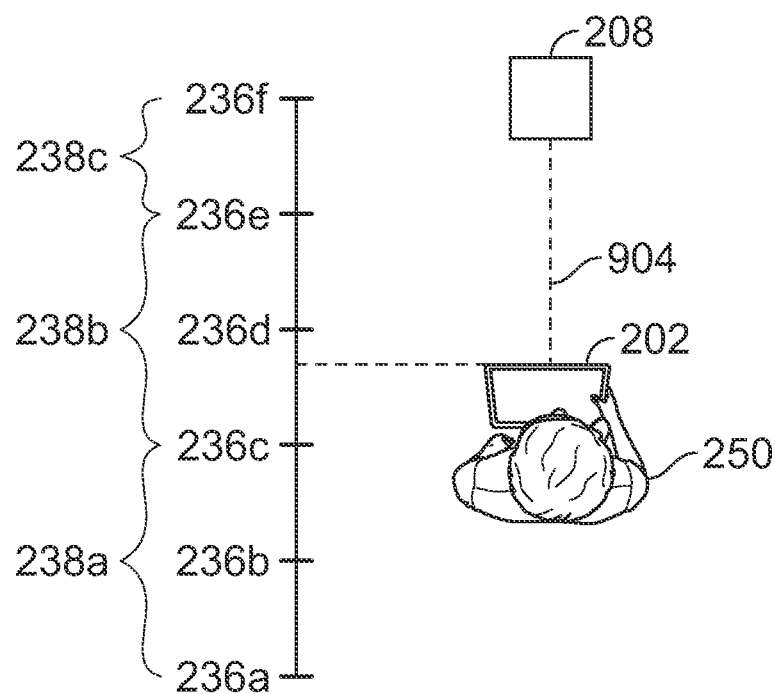
FIGS. 9A-9B depict an exemplary technique for non-linearly resizing a virtual object in accordance with some embodiments.

FIG. 9A illustrates a scenario where person 250 has not moved to a different location. As depicted in FIG. 9A, the viewpoint location remains distance 804/904 away from the virtual object location.

Figure 9B:
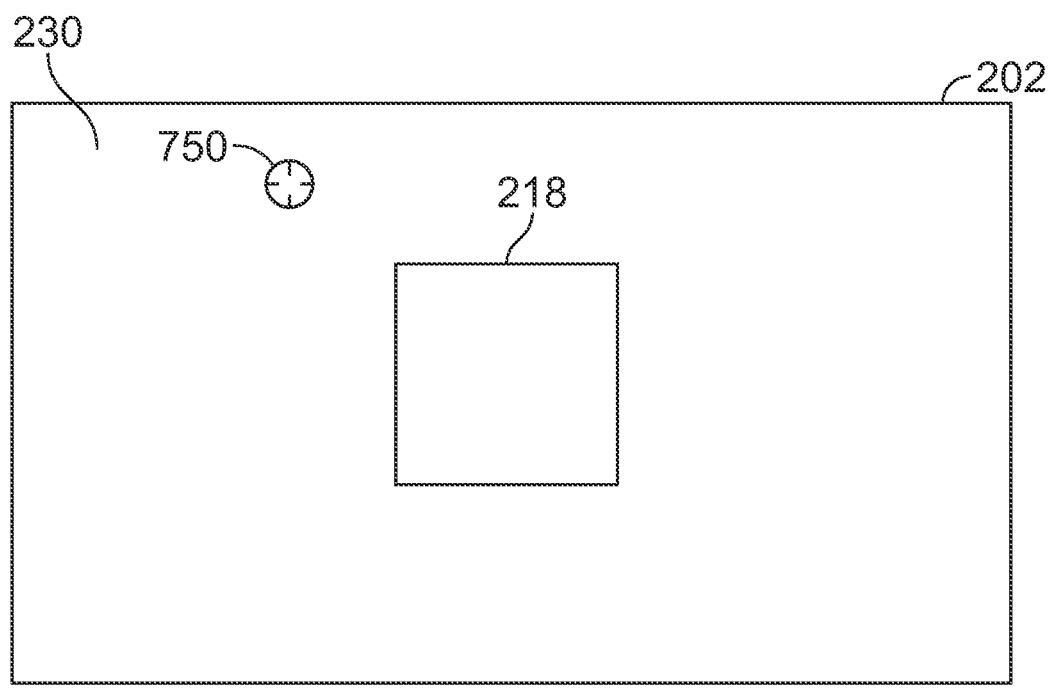

FIG. 9B illustrates display screen 230 at a time that corresponds to the scenario depicted in FIG. 9A. As shown in FIG. 9B, detected gaze position 750 is at different position than it was in FIG. 8B.

Assume that in FIGS. 9A-9B, display device 202 receives information corresponding to detected gaze position 750. In response to receiving information corresponding to detected gaze position 750, display device 202 determines that detected gaze position 750 is not within a predetermined threshold distance from a location that corresponds to virtual object 208 (or representation 218). As depicted in FIG. 9A, display device 202 changes the size of virtual object 208 based on this determination.

In some embodiments, display device 202 changes the size of virtual object 208 because display device 202 has determined that a person is not looking at virtual object 208 when detected gaze position 750 is not within a predetermined threshold distance from a location that corresponds to virtual object 208. In some embodiments, changing the sizes of virtual objects while a person is looking at the virtual object can create a user interface that is more likely to be visually distracting or disorienting to the person.

In some embodiments, the size of virtual object 208 is decreased to a size that corresponds to set of continuous distances 238b.

In some embodiments, display device 202 maintains the size of other virtual objects based on a determination that detected gaze position 750 is within a predetermined threshold distance of the other virtual objects (e.g., detecting that the person is looking away from the virtual object) while changing the size of virtual object 208. In some embodiments, display device 202 maintains the size of the other virtual objects because the virtual object is not a type of object that is configured to be resized (or resized while display device 202 is within the particular set of continuous distances), as described above in relation to FIGS. 4A-4B.

Turning back to FIG. 9B, the size of representation 218 decreases because the size of virtual object 208 has decreased while person 250 is standing at the same position in FIGS. 8A and 9A.

Figure 10A:
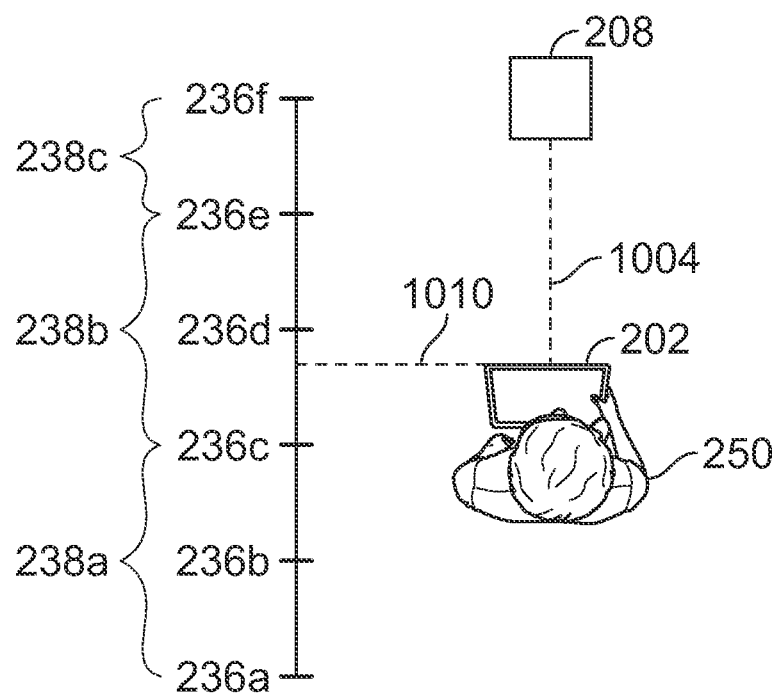
FIGS. 10A-10B depict an exemplary technique for non-linearly resizing a virtual object in accordance with some embodiments.

FIG. 10A illustrated a scenario where person 250 has not moved to a different location. As depicted in FIG. 10A, the viewpoint location remains distance 804/904/1004 away from the virtual object location.

Figure 10B:
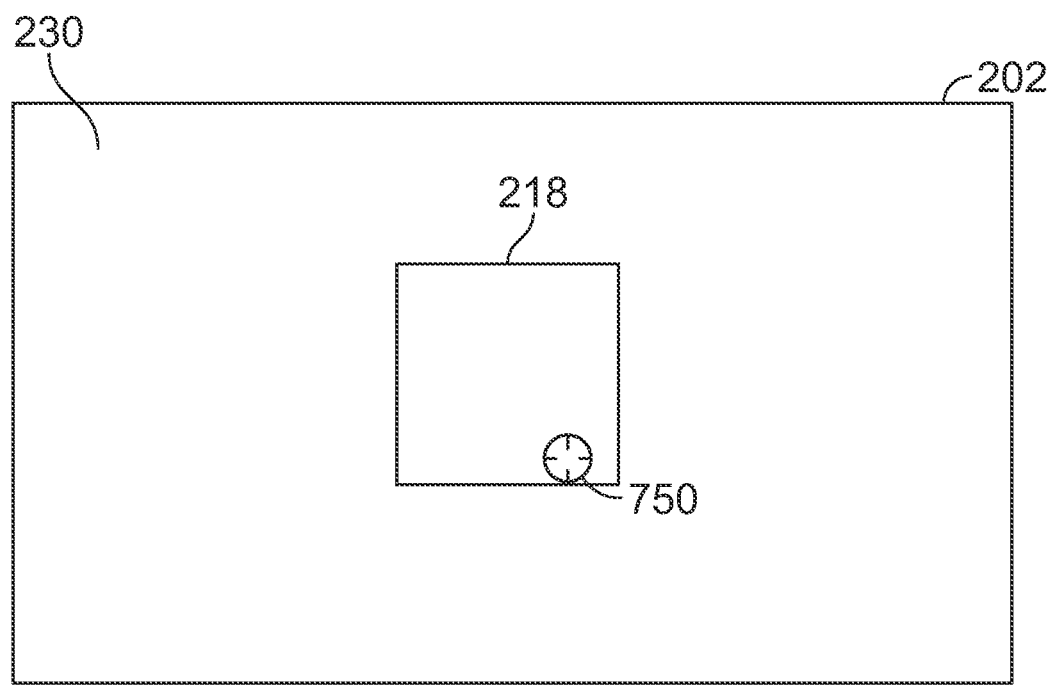

FIG. 10B illustrates display screen 230 at a time that corresponds to the scenario depicted in FIG. 10A. With respect to FIGS. 10A-10B, display device 202 maintains (or does not change) the size of virtual object 208 because detected gaze position 750 is currently within a predetermined threshold distance from virtual object 208 (e.g., user (or person) is looking at virtual object 208), using similar techniques as described above in relation to FIG. 8A. Also, display device 202 maintains (or does not change) the size of virtual object 208 because person 250 remains within the same set of continuous distances 238b. In addition, device 202 does not change the size of representation 218 because virtual object 208 has not changed size and person 250 is standing at the same position.

While the examples in FIGS. 7A-7B, 8A-8B, 9A-9B, and 10A-10B, depict a scenario where display device 202 (or another component of system 100) changes (or does not change) the size of a virtual object based on the detected gaze of the user moving within display screen 230, one or more other embodiments can also be realized. For example, display device 202 (or another component of system 100) can change the size of a virtual object when display device 202 is moved such that the virtual object does not appear in the person's field-of-view and/or display screen 230. Similarly, display device 202 (or another component of system 100) can forgo changing the size of a virtual object when display device 202 is positioned such that the virtual object does appear in the person's field-of-view and/or display screen 230. Additionally or alternatively, display device 202 (or another component of system 100) can change the size of a virtual object when the virtual object moves in the environment while the gaze of the person or field-of-view/ display screen 230 remains stationary, such that, for example, the detected gaze of the person is not focusing on or looking at the object, or the virtual object does not appear in the person's field-of-view and/or display screen 230. Similarly, display device 202 (or another component of system 100) can forgo changing the size of a virtual object when the virtual object moves in the environment while the gaze of the person or field-of-view/display screen 230 remains stationary, such that, for example, the detected gaze of the person is focusing on or looking at the object, or the virtual object does appear in the person's field-of-view and/or display screen 230.

Moreover, with respect to the examples in 2A-2B, 3A-3B, 4A-4B, 5A-5B, 6A-6B, 7A-7B, 8A-8B, 9A-9B, and 10A-10B, the distances (e.g., 204, 304, 404, etc.) change based on the viewpoint location changing. However, one or more other embodiments can also be realized. For example, additionally or alternatively, the distances can change based on the virtual object location changing.

Additionally, with respect to the examples in 2A-2B, 3A-3B, 4A-4B, 5A-5B, 6A-6B, 7A-7B, 8A-8B, 9A-9B, and 10A-10B, the display device 202 is shown having a single two-dimensional display (and corresponding single detected gaze 750). It should be appreciated that, in some embodiments, display device 202 can include a stereo pair of display screens 230 and corresponding detected gazes 750 for each eye.

Figure 11:
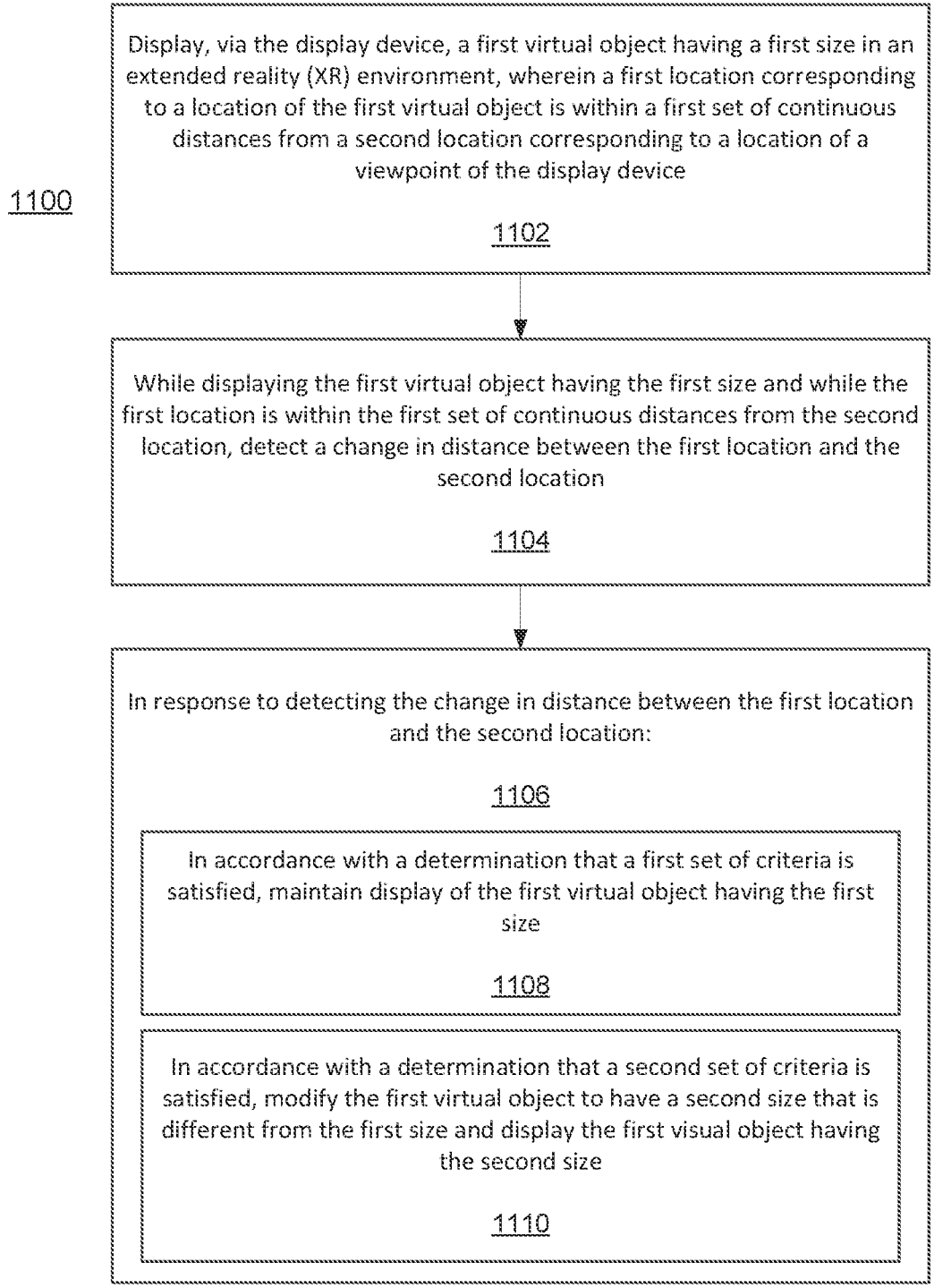
FIG. 11 is a flow diagram illustrating a method for non-linearly resizing a virtual object in accordance with some embodiments.

FIG. 11 is a flow diagram illustrating a method for non-linearly resizing a virtual object in accordance with some embodiments. In some embodiments, the method is performed by system 100 (FIGS. 1A and 1). In some embodiments, the method is performed by display device 202. In some embodiments, the method is performed by a third device or system that is different from display device 202 or system 100. In some embodiments, the method is performed by a combination of one or more of system 100, display device 202, and the third device or system.

At block 1102, a first virtual object is displayed in an XR environment. The first virtual object has a first location that corresponds to the location of the first virtual object. In some embodiments, the first location is within a first set of continuous distances from a second location corresponding to a location of a viewpoint (e.g., the viewpoint location) of the display device. For example, as described above in relation to FIGS. 2A-2B, virtual object 208 is displayed on display screen 230 of display device 202 and virtual object 208 has a first size. Moreover, in some embodiments of FIGS. 2A-2B, virtual object 208 is at location in a XR environment that corresponds to the virtual object location.

In some embodiments, the first virtual object corresponds to a physical object or article in a physical environment that resembles at least a portion of the XR environment. In some embodiments, the size of the virtual object can include one or more of the virtual object's length, width, area, volume, etc.

In some embodiments, the first location is within a first set of continuous distances from a second location. For example, as described above in relation to FIGS. 2A-2B, the virtual object 208 is at a location that corresponds to the virtual object location (e.g., first location) that is distance 204 from the viewpoint location. Moreover, in some embodiments of FIGS. 2A-2B, distance 204 is within set of continuous distances 238a.

In some embodiments, a set of continuous distances can be defined in different ways. In some embodiments, a set of continuous distances can be defined as a set of sequential distances. For example, a set of sequential distances can correspond to all distances where a location corresponding to the location of the virtual object is 3 m to 5 m away from the location corresponding to a location of the viewpoint.

In some embodiments, a set of continuous distances can be defined by points in space. For example, the viewpoint location that is positioned at any coordinate positions of (0, 3) to (0, 5) while the location corresponding to the location of the virtual object is at position (0, 0).

In some embodiments, one or more line segments define a set of continuous distances. For example, one endpoint of the line segment (e.g., minimum threshold distance) can be at 3 m and the other end of the line segment (e.g., maximum threshold distance) can be at 5 m. In some embodiments, the line segment defines distances between a location that corresponds to the virtual object and a location that corresponds to the viewpoint location.

With reference to FIG. 11, at block 1104, a change in distance between the first location and the second location is detected while displaying the first virtual object having the first size and while the distance between the first location and the second location is within the first set of continuous distances. For example, with reference to FIGS. 2A-2B, 3A-3B, and/or 4A-4B, a change in distance is detected when the viewpoint location moves from distance 204 to distance 304 away from the virtual object location or when the viewpoint location moves from distance 304 to distance 404 away from the virtual object location.

In some embodiments, the change is detected when one or more of the location of the viewpoint and the location of the virtual object changes. In some embodiments, the change in distance is an incremental change in distance. In some embodiments, the change in distance is not recognized until it satisfies some threshold. For example, in some embodiments, a change in distance is detected when the display device has moved a first threshold distance from an original position, such as a meter. In addition, in some embodiments, the change in distance is not detected when the display device has not moved the first threshold distance from an original position.

In some embodiments, the term "first location" refers to a different location when the location of the virtual object changes and/or is updated to reference the new location of the virtual object when the virtual object moves. In some embodiments, the term "second location" refers to a different location when the location of the viewpoint changes and/or is updated to reference the new location of the viewpoint when the viewpoint moves. In some embodiments, the change is detected when the distance between the first location and the second location has reduced or increased by an incremental distance and not detected when the distance between the first and the second location has only increased by a distance less than the incremental distance.

In some embodiments, the first location and the second location are locations in a three-dimensional space. In some embodiments, the first location and the second location are locations in a two-dimensional space.

With reference to FIG. 11, at blocks 1106 and 1108, in response to detecting the change in distance between the first location and the second location and in accordance with a determination that a first set of criteria is satisfied, display of the first virtual object is maintained. In some embodiments, the first set of criteria includes a criterion that is satisfied when the first location is within (or remains in) the first set of continuous distances from the second location. For example, with reference to FIGS. 2A-2B and 3A-3B, the size of virtual object 208 is maintained because the distance between the viewpoint location and the virtual object location remains within set of continuous distances 238a when FIGS. 2A-2B is compared with FIGS. 3A-3B.

In some embodiments, displaying the first virtual object includes displaying a representation of the first virtual object. In some embodiments, modifying the first virtual object such that the first virtual object has the second size that is different from the first size includes modifying a size of the representation of the first virtual object based on the second size. In some embodiments, while displaying the representation of the first virtual object and in accordance with a determination that the first set of criteria is satisfied, the electronic device modifies a size of the representation of the first virtual object while displaying the first virtual object having the second size that is different from the first size. In some embodiments, the representation of the first virtual object includes a two-dimensional object and the first virtual object is a three-dimensional object.

In some embodiments, the first virtual object is maintained having the first size while the viewpoint location (e.g., second location) is any distance away from the virtual object location (e.g., first location) that is within the first set of continuous distances (e.g., 238a).

With reference to FIG. 11, at blocks 1106 and 1110, in response to detecting the change in distance between the first location and the second location and in accordance with a determination that a second set of criteria is satisfied, the first virtual object is modified to have a second size that is different from the first size and the first virtual object is displayed having the second size. In some embodiments, the second set of criteria includes a criterion that is satisfied when the first location is not within (or remains in) the first set of continuous distances from the second location. In some embodiments, the second set of criteria includes a criterion that is satisfied when the first location is within a second set of continuous distances from the second location. For example, with reference to FIGS. 3A-3B and 4A-4B, the size of virtual object 208 is changed because the distance 404 between the viewpoint location and the virtual object location is in a new set of continuous distances (e.g., 238b) in FIG. 4A than the distance 304 (e.g., within set of continuous distances 238a) was in FIG. 3A.

In some embodiments, the second set of criteria includes a criterion that is satisfied when the first location is within a second set of continuous distances from the second location and when the first location is above (or below) a particular threshold distance within the second set of continuous distances. In other words, in some embodiments, the virtual object is determined to be resized based on whether the distance between the virtual object and the viewpoint location is above (or below) a threshold distance that is included in the new set of continuous distances. For example, when the new set of continuous distances is the distances from 1-2 meters between the viewpoint location and the virtual object, the virtual object may not be resized until the distance the virtual object and the viewpoint location is above a threshold distance (e.g., 1.2, 1.33, 1.41 meters) when the viewpoint location is moving further away from the virtual object or below a threshold distance (e.g., 1.8, 1.7, 1.74 meters) when the viewpoint location is moving towards the virtual object. In other words, the virtual object is not be resized until a determination is made that the distance between the viewpoint location and the virtual object is comfortably within the new set of continuous distance. In some embodiments, forgoing the resizing of the virtual object until the distance the virtual object and the viewpoint location is above a threshold distance eliminates jitter and/or continuously increasing and decreasing the size of the virtual object when the distance between the virtual object and the viewpoint location near an endpoint of the new set of continuous distances.

In some embodiments, after the distance the virtual object and the viewpoint location is above threshold distance (e.g., 1.2 meters) (or below the threshold distance) and the object has been resized, the virtual object is not resized again while distance between the virtual object is within the new set of continuous distances (1-2 meters), even if the distance between the virtual object and the virtual location goes below (or above) the threshold distance (e.g., 1.2 meters). Thus, in some embodiments, the virtual object is only resized once while the object is within the new set of continuous distances and is not resized again until the distance between the viewpoint location and the virtual object is within a different set of continuous distances.

In some embodiments, displaying the first virtual object includes displaying a representation of the first virtual object. In some embodiments, while displaying the representation of the first virtual object having the first size and in accordance with a determination that the second set of criteria is satisfied, the electronic device modifies a size of the representation of the first virtual object while maintaining display of the first virtual object having the first size.

In some embodiments, the first virtual object is displayed having the second size while the first virtual object is within the second set of continuous distances. In some embodiments, the first virtual object is displayed having the second size because the first location is within the first set of continuous distances (e.g., 238b) from second location. In some embodiments, the first virtual object is displayed having the second size because the first location is at any distance within the second set of continuous distances (e.g., 238b) from second location. In some embodiments, when the distance between the first location and the second location is within (or at any point or distance within) the second set of continuous distances from the virtual object, the first virtual object is displayed having the second size.

In some embodiments, the size of the virtual object is not dependent on the particular distance that the first location is from the second location. But, instead, the size of the virtual object is dependent on the set of continuous distances that the distance between the first location and the second location lies within. In some embodiments, the size of the virtual object is independent of the position of the virtual object relative to the viewpoint displayed at the display device in the XR environment.

In some embodiments, the size of the virtual object is dependent on a particular set of continuous distances. For example, the size of the virtual object can be small when the distance between the first location and the second location is within the first set of continuous distances, medium when the distance between the first location and the second location is within the second set of continuous distances, and large when the distance between the first location and the second location is within the third set of continuous distances. In some embodiments, the first size is a predetermined size that is based on the first set of continuous distances. In some embodiments, the second size is a predetermined size that is based on the second set of continuous distances.

In some embodiments, in accordance with a determination that the change in distance between the first location and the second location has caused the distance between the first location and the second location to decrease, the second size is smaller than the first size. In some embodiments, in accordance with a determination that the change in distance between the first location and the second location has caused the distance between the first location and the second location to increase, the second size is greater than the first size.

In some embodiments, as a part of the first virtual object being displayed having the second size that is different from the first size, a third virtual object is maintained that has a sixth size. In some embodiments, while one or more other objects change sizes, the sizes of one or more other objects remain the same. In some embodiments, when changing the size of one object while maintaining the size of another object, the size of the one object is continuously adjusted to make the other object appear as though it is moving in relation to the other object. In some of these embodiments, the other object appears as if it is moving closer/away from the viewpoint.

In some embodiments, the second set of criteria includes a criterion that is satisfied when the first virtual object has not changed prior to being displayed having the first size. In some embodiments, some virtual objects only change size a predetermined number of times during a session. In some embodiments, different virtual objects change sizes based on different determinations involving different sets of continuous distances, different predetermined maximum number of times for scaling, different time limits regarding when the virtual objects first appear, etc.

In some embodiments, the second set of criteria includes a criterion that is satisfied when a determination is made that a field-of-view of the electronic device is not within a predetermined distance of a location that corresponds to the first position.

In some embodiments, in response to detecting the change in the distance between the first location and the second location and in accordance with a determination that a third set of criteria is satisfied, wherein the third set of criteria includes a criterion that is satisfied when the first location is within a third set of continuous distances, the first virtual object is displayed having a third size that is different from the first size and the second size. In some embodiments, the third set of continuous distances is different from the first set of continuous distances and the second set of continuous distances. In some embodiments, the first virtual object is modified to have a third size that is different from the first size and the second size and displayed having the third size while the first location is within any distances in the third set of continuous distances from the second location.

In some embodiments, the first set of continuous distances from the location corresponding to a location of the viewpoint and the second set of continuous distances from the location corresponding to a location of the viewpoint are neighboring sets of continuous distances. In some embodiments, neighboring sets of continuous distances are sets that share each other's minimum and/or maximum threshold value. For example, if the first set of continuous distances is greater than or equal to 3 m and less than 5 m while the second set of continuous distances is greater than or equal to 5 m and less than 10 m, the first and second sets of continuous distances are neighboring sets of continuous distances because they respectively share the minimum and maximum threshold values of 5 m. In some embodiments, sets of continuous distances are neighboring sets of continuous distances because they are contiguous sets of distances.

In some embodiments, the third set of continuous distances is a neighbor with the first set of continuous distances or the second set of continuous distances, or both. In some embodiments, all or none of the sets of continuous distances are neighbors.

In some embodiments, the first set of continuous distances and the second set of continuous distances do not overlap. In some embodiments, the third set of continuous distances overlap (e.g., boundary locations, such as virtual locations 236c and/or 236e)) with the first set of continuous distances, the second set of continuous distances, or both. In some embodiments, none of the sets of continuous distances overlap.

In some embodiments, each distance in the first set of continuous distances is outside of the second set of continuous distances. In other words, each distance in the first set of continuous distances is not within the second set of continuous distances (and vice-versa).

In some embodiments, a second virtual object is displayed. In some embodiments, in accordance with the determination that the first set of criteria is satisfied, the second virtual object is displayed having the first size. In some embodiments, in accordance with the determination that the second set of criteria is satisfied, the second virtual object is also displayed having the first size.

In some embodiments, virtual objects only change size when they first appear.

In some embodiments, a second virtual object having a fourth size is displayed. In some embodiments, in accordance with the determination that the first set of criteria is satisfied, the display of the second virtual object having the fourth size is maintained. In some embodiments, in accordance with the determination that the second set of criteria is satisfied, the second virtual object is modified to have a fifth size that is different from the fourth size and the second virtual object having the fifth size is displayed.

Figure 12:
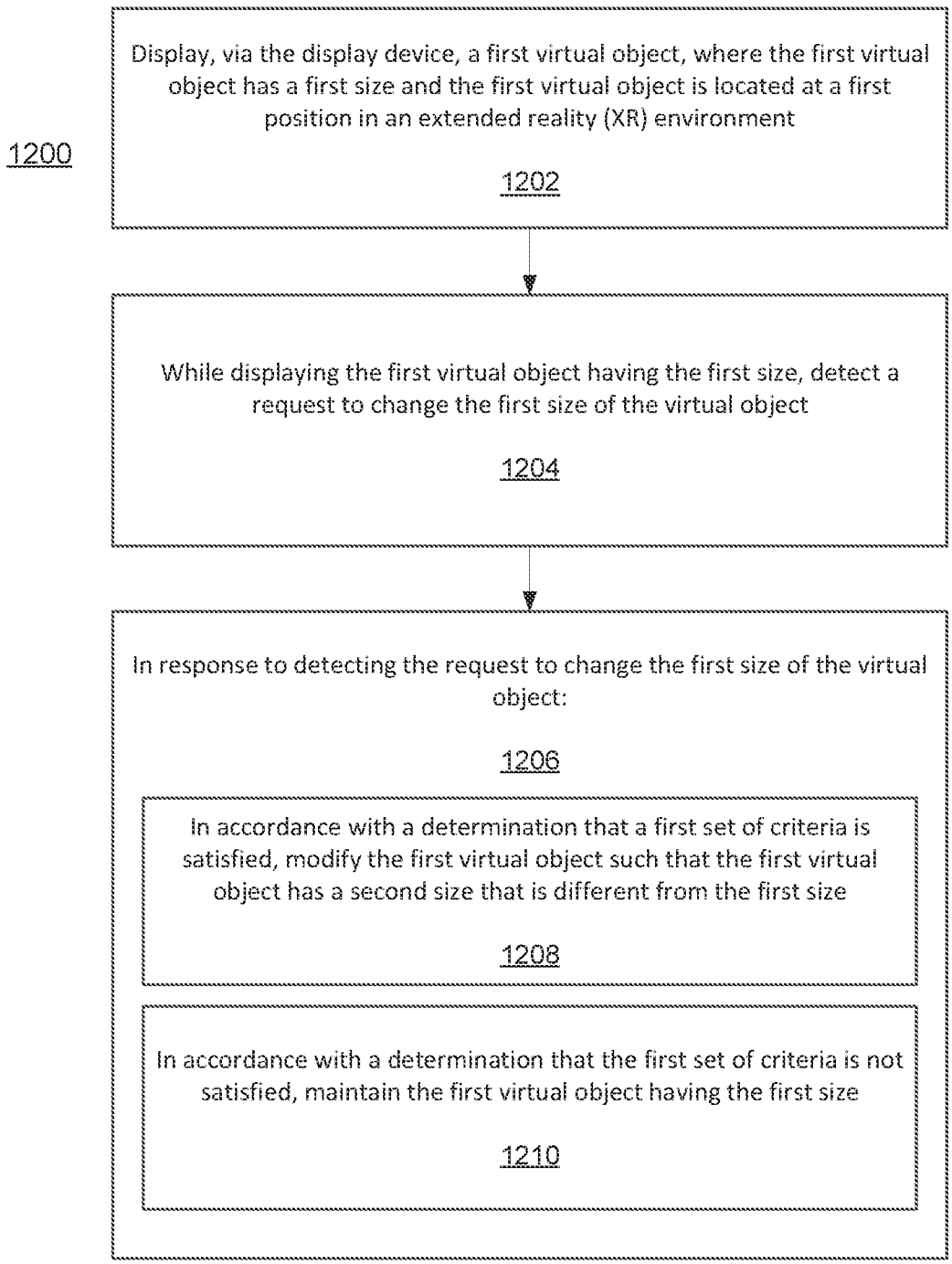
FIG. 12 is a flow diagram illustrating a method for non-linearly resizing a virtual object in accordance with some embodiments.

FIG. 12 is a flow diagram illustrating a method for non-linearly resizing a virtual object in accordance with some embodiments. In some embodiments, the method is performed by system 100 (FIGS. 1A and 1). In some embodiments, the method is performed by display device 202. In some embodiments, the method is performed by a third device or system that is different from display device 202 or system 100. In some embodiments, the method is performed by a combination of one or more of system 100, display device 202, and the third device or system.

At block 1202, a first virtual object (e.g., 208) is displayed. In some embodiments, the first virtual object has a first size and the first virtual object is located at a first position in a XR environment. In some embodiments, the first virtual object can have one or more features as described above in relation to the first virtual object in FIG. 11.

With reference to FIG. 12, at block 1204, while displaying the first virtual object (e.g., 208) having the first size, a request to change the first size of the virtual object is detected. In some embodiments, displaying the first virtual object includes displaying a representation of the first virtual object.

With reference to FIG. 12, at blocks 1206 and 1208, in response to detecting the request to change the first size of the virtual object and in accordance with a determination that a first set of criteria is satisfied, the first virtual object is modified such that the first virtual object has a second size that is different from the first size. In some embodiments, the first set of criteria includes a criterion that is satisfied when a determination is made that a detected gaze is directed away from the first position. For example, the size of virtual object 208 is smaller in FIG. 9A than the size of virtual object 208 in FIG. 8A because the detected gaze 750 of the user is not within a predetermined distance from a position that corresponds to virtual object 208.

In some embodiments, the request to change the first size of the virtual object is detected by detecting a change in distance between a location corresponding to the location of the virtual object and a viewpoint location, as described above in relation to FIG. 11. In some embodiments, a request to change the size of a virtual object is detected when a request is received from one or more internal or external applications, processes, sensors, etc. In some embodiments, a request to change the size of a virtual object is detected based on one or more parameters (e.g., application parameters).

In some embodiments, the determination that the detected gaze of the user is directed away from the first position is satisfied when a determination is made that the detected gaze is within a predetermined distance from a third virtual object that is different from the first virtual object. In some embodiments, the detected gaze of a user is found at a location in the XR environment.

In some embodiments, the determination that the user is looking at the virtual object is satisfied when a determination is made that the location of the detected gaze (750) of the user is within a threshold distance of the location of the third virtual object (or from (e.g., away from) the first virtual object).

In some embodiments, the determination that the detected gaze is directed away from the first virtual object is satisfied when a determination is made that the detected gaze is not within a predetermined distance from a portion of the XR environment. In some embodiments, the portion of the XR environment includes two or more virtual objects. In some embodiments, the portion of the XR environment includes the first virtual object.

In some embodiments, the determination that the user is looking at the virtual object is satisfied when a determination is made that the location of the detected gaze of the user is within a threshold distance of one or more locations that correspond to the portion of the XR environment that includes the first virtual object.

In some embodiments, the first set of criteria includes a criterion that is satisfied when the virtual object (e.g., 208) has not changed prior to being displayed having the first size.

In some embodiments, some virtual objects only change size a predetermined number of times (e.g., once, twice) during a session. In some embodiments, different virtual objects change sizes based on different determinations involving different sets of continuous distances, different predetermined maximum number of times for scaling, and/or different time limits regarding when the virtual objects first appear.

In some embodiments, the first set of criteria includes a criterion that is satisfied when the electronic device is within a second set of continuous distances from a location that corresponds to a position of the virtual object, using one or more techniques as discussed above in relation to FIG. 11.

In some embodiments, as a part of modifying the first virtual object such that the first virtual object has the second size that is different from the first size, the modification of a second virtual object is forgone, using one or more techniques discussed above in relation to FIG. 11.

In some embodiments, the first virtual object is maintained such that the first virtual object has the second size after modifying the first virtual object such that the first virtual object has a second size that is different from the first size and while the first virtual object has the second size and in accordance with a determination that the first set of criteria is satisfied.

In some embodiments, the size of the virtual object is maintained when a detected gaze returns back to the object after modifying the virtual object to the size of the object in accordance with the determination that the first set of criteria is not satisfied.

In some embodiments, modifying the first virtual object such that the first virtual object has a second size that is different from the first size includes modifying a size of a representation of the first virtual object. In some embodiments, maintaining the first virtual object having the first size includes modifying a size of a representation of the first virtual object. In some embodiments, the representation of the first virtual object is a two-dimensional object and the first virtual object is a three-dimensional object.

In some embodiments, maintaining display of the first virtual object having the first size includes modifying a size of the representation of the first virtual object based on the changed distance between the first location and the second location and the first size. In some embodiments, displaying the first virtual object having the second size includes modifying a size of the representation of the first virtual object based on the changed distance between the first location and the second location and the second size.

With reference to FIG. 12, at blocks 1206 and 1210, in response to detecting the request to change the first size of the virtual object and in accordance with a determination that the first set of criteria is not satisfied, the first virtual object is maintained having the first size. In some embodiments, the first virtual object having the first size is displayed while the current gaze of the user is outside of the first threshold distance. For example, the size of virtual object 208 is maintained in FIG. 8A when compared to the size of virtual object 208 in FIG. 7A because the detected gaze 750 of the user is within a predetermined distance from a position that corresponds to virtual object 208 (e.g., the first position). In addition, the display of the first virtual object having the first size is maintained, which includes the size of the representation changing, for example, in FIGS. 7B and 8B.

In some embodiments, the set of criteria are not satisfied when a determination is made that a current gaze of the user is directed toward the first virtual object. In some embodiments, the determination that a current gaze of the user is directed toward the first virtual object is made when a detected gaze of a user is directed at a second position within the XR environment that is above or equal to a threshold distance from the first position of the first virtual object.

In some embodiments, the first virtual object is modified, such that the first virtual object has the second size that is different from the first size, after maintaining the first virtual object having the first size and in accordance with a determination that the first set of criteria is satisfied. In some embodiments, modifying the first virtual object includes displaying a virtual object that is different from the first virtual object.

In some embodiments, after maintaining the first virtual object such that the first visual object has the second size and in accordance with a determination that the first set of criteria is satisfied, the first virtual object is modified such that the first visual object has a third size that is different from the first size and the second size.

In some embodiments, the size of the virtual object is changed when a detected gaze is detected away back to the object (e.g., when a user looks away from the object) after maintaining the size of the object in accordance with the determination that the first set of criteria is satisfied.

In some embodiments, the first virtual object that has the second size is displayed at a second position in the XR environment. In some embodiments, the second position is within a first set of continuous distances in the XR environment and the virtual object is displayed at the second position, using one or more techniques as discussed above in relation to FIG. 11.

In some embodiments, the size of the virtual object is a predetermined size that corresponds to the first set of continuous distances in the XR environment. In some embodiments, the size of the virtual object is not dependent on the particular distance that the virtual object is from the location corresponding to a location of the viewpoint but, instead, the size of the virtual object is dependent on the set of continuous distances that the distance that it is from the location corresponding to a location of the viewpoint lies within. In some embodiments, the size of the virtual object is independent of the position of the virtual object relative to the viewpoint displayed at the display device in the XR environment. In some embodiments, the size of the virtual object is dependent on the set of continuous distances.

As described above, one aspect of the present technology is the gathering and use of data available from various sources to provide specialized resource management of devices to conserve battery life for users and to provide specialized content to users of the devices. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to conserve the battery life of a user's device. Accordingly, for example, the use of such personal information data helps the system to properly manage resources to conserve battery life for the devices. Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, in the case of managing resources for low-powered devices, the present technology can be configured to allow users to select to "opt in" or "opt out" of participation in the collection of personal information data during registration for services or anytime thereafter. In another example, users can select not to provide eye-tracking data, such as pupil location, pupil dilation, and/or blink rate for specialized resource management. In yet another example, users can select to limit the length of time the eye-tracking data is maintained or entirely prohibit the development of a baseline eye-tracking profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health-related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers the use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, resources of low-powered devices can be managed and content (e.g., status updates and/or objects) can be selected and delivered to users by inferring preferences based on non-personal information data or a bare minimum amount of personal information, such as the content being requested by the device associated with a user, other non-personal information available to the system controlling the device, or publicly available information.

What is claimed is:

1. A system, comprising:
a display device;
one or more processors; and
memory storing one or more programs configured to be executed by the one or more processors, the one or more programs including instructions for:
displaying, via the display device, a first representation of a first virtual object based on the first virtual object having a first size, wherein a distance between a first location corresponding to a location of the first virtual object and a second location corresponding to a location of a viewpoint of the display device is between a first threshold distance and a second threshold distance that is less than the first threshold distance;
while displaying the first representation of the first virtual object and while the distance between the first location and the second location is between the first threshold distance and the second threshold distance, detecting a change in the distance between the first location and the second location; and
in response to detecting the change in the distance between the first location and the second location:
in accordance with a determination that a first set of criteria is satisfied, wherein the first set of criteria includes a criterion that is satisfied when the changed distance between the first location and the second location is between the first threshold distance and the second threshold distance:
maintaining the first size of the first virtual object, wherein the first virtual object has the first size while the changed distance between the first location and the second location is between the first threshold distance and the second threshold distance; and
displaying, via the display device, a second representation of the first virtual object based on the first virtual object having the first size, wherein a size of the second representation of the first virtual object is different from a size of the first representation of the first virtual object;
in accordance with a determination that a second set of criteria is satisfied, wherein the second set of criteria includes a criterion that is satisfied when the changed distance between the first location and the second location is between a third threshold distance and a fourth threshold distance that is greater than the third threshold distance:
modifying the first virtual object to have a second size that is different from the first size; and
displaying a third representation of the first virtual object based on the first virtual object having the second size, wherein the first threshold distance is less than the third threshold distance, wherein the second threshold distance is less than the fourth threshold distance, and wherein the first virtual object has the second size while the changed distance between the first location and the second location is between the third threshold distance and the fourth threshold distance; and
in accordance with a determination that a third set of criteria is satisfied, wherein the third set of criteria includes a criterion that is satisfied when the changed distance between the first location and the second location is between a fifth threshold distance and a sixth threshold distance:
  modifying the first virtual object to have a third size that is different from the first size and the second size; and
  displaying a fourth representation of the first virtual object based on the first virtual object having the third size, wherein the first threshold distance and third threshold distance are less than the fifth threshold distance, and wherein the second threshold distance and the fourth threshold distance are less than the sixth threshold distance, and wherein the first virtual object has the third size while the changed distance between the first location and the second location is between the fifth threshold distance and the sixth threshold distance.

2. The system of claim 1, wherein the second threshold distance is less than or equal to the third threshold distance.

3. The system of claim 1, wherein the second set of criteria includes a criterion that is satisfied when a determination is made that a detected gaze of a user or a field-of-view of an electronic device is not within a predetermined distance of a location that corresponds to the first location.

4. The system of claim 1, wherein the second set of criteria includes a criterion that is satisfied when the first virtual object has not changed prior to a representation of the first virtual object being displayed based on the first virtual object having the first size.

5. The system of claim 1, wherein:
in accordance with a determination that the change in distance between the first location and the second location has caused the distance between the first location and the second location to decrease, the second size is smaller than the first size; and
in accordance with a determination that the change in distance between the first location and the second location has caused the distance between the first location and the second location to increase, the second size is greater than the first size.

6. The system of claim 1, wherein:
the first size is a predetermined size that is based on one or more distances between the first threshold distance and the second threshold distance; and
the second size is a predetermined size that is based on one or more distances between the third threshold distance and the fourth threshold distance.

7. The system of claim 1, wherein displaying the third representation of the first virtual object based on the first virtual object having the second size includes maintaining display of a representation of a second virtual object that is based on a sixth size.

8. The system of claim 1, wherein:
the first threshold distance and the second threshold distance correspond to a first set of distances; and
the third threshold distance and the fourth threshold distance correspond to a second set of distances; and
the first set of distances is contiguous with the second set of distances.

9. A non-transitory computer-readable storage medium storing one or more programs configured to be executed by one or more processors of a system having a display device, the one or more programs including instructions for:
displaying, via the display device, a first representation of a first virtual object based on the first virtual object having a first size, wherein a distance between a first location corresponding to a location of the first virtual object and a second location corresponding to a location of a viewpoint of the display device is between a first threshold distance and a second threshold distance that is less than the first threshold distance;
while displaying the first representation of the first virtual object and while the distance between the first location and the second location is between the first threshold distance and the second threshold distance, detecting a change in the distance between the first location and the second location; and
in response to detecting the change in the distance between the first location and the second location:
  in accordance with a determination that a first set of criteria is satisfied, wherein the first set of criteria includes a criterion that is satisfied when the changed distance between the first location and the second location is between the first threshold distance and the second threshold distance:
    maintaining the first size of the first virtual object, wherein the first virtual object has the first size while the changed distance between the first location and the second location is between the first threshold distance and the second threshold distance; and
    displaying, via the display device, a second representation of the first virtual object based on the first virtual object having the first size, wherein a size of the second representation of the first virtual object is different from a size of the first representation of the first virtual object;
  in accordance with a determination that a second set of criteria is satisfied, wherein the second set of criteria includes a criterion that is satisfied when the changed distance between the first location and the second location is between a third threshold distance and a fourth threshold distance that is greater than the third threshold distance:
    modifying the first virtual object to have a second size that is different from the first size; and
    displaying a third representation of the first virtual object based on the first virtual object having the second size, wherein the first threshold distance is less than the third threshold distance, wherein the second threshold distance is less than the fourth threshold distance, and wherein the first virtual object has the second size while the changed distance between the first location and the second location is between the third threshold distance and the fourth threshold distance; and
  in accordance with a determination that a third set of criteria is satisfied, wherein the third set of criteria includes a criterion that is satisfied when the changed distance between the first location and the second location is between a fifth threshold distance and a sixth threshold distance:
    modifying the first virtual object to have a third size that is different from the first size and the second size; and
    displaying a fourth representation of the first virtual object based on the first virtual object having the third size, wherein the first threshold distance and third threshold distance are less than the fifth threshold distance, and wherein the second threshold distance and the fourth threshold distance are less than the sixth threshold distance, and wherein the first virtual object has the third size while the changed distance between the first location and the second location is between the fifth threshold distance and the sixth threshold distance.

10. The non-transitory computer-readable storage medium of claim 9, wherein the second threshold distance is less than or equal to the third threshold distance.

11. The non-transitory computer-readable storage medium of claim 9, wherein the second set of criteria includes a criterion that is satisfied when a determination is made that a detected gaze of a user or a field-of-view of an electronic device is not within a predetermined distance of a location that corresponds to the first location.

12. The non-transitory computer-readable storage medium of claim 9, wherein the second set of criteria includes a criterion that is satisfied when the first virtual object has not changed prior to a representation of the first virtual object being displayed based on the first virtual object having the first size.

13. The non-transitory computer-readable storage medium of claim 9, wherein:
 in accordance with a determination that the change in distance between the first location and the second location has caused the distance between the first location and the second location to decrease, the second size is smaller than the first size; and
 in accordance with a determination that the change in distance between the first location and the second location has caused the distance between the first location and the second location to increase, the second size is greater than the first size.

14. The non-transitory computer-readable storage medium of claim 9, wherein:
 the first size is a predetermined size that is based on one or more distances between the first threshold distance and the second threshold distance; and
 the second size is a predetermined size that is based on one or more distances between the third threshold distance and the fourth threshold distance.

15. The non-transitory computer-readable storage medium of claim 9, wherein displaying the third representation of the first virtual object based on the first virtual object having the second size includes maintaining display of a representation of a second virtual object that has a sixth size.

16. The non-transitory computer-readable storage medium of claim 9, wherein:
 the first threshold distance and the second threshold distance correspond to a first set of distances; and
 the third threshold distance and the fourth threshold distance correspond to a second set of distances; and
 the first set of distances is contiguous with the second set of distances.

17. A method, comprising:
 at a system having one or more processors, memory, and a display device:
  displaying, via the display device, a first representation of a first virtual object based on the first virtual object having a first size, wherein a distance between a first location corresponding to a location of the first virtual object and a second location corresponding to a location of a viewpoint of the display device is between a first threshold distance and a second threshold distance that is less than the first threshold distance;
  while displaying the first representation of the first virtual object and while the distance between the first location and the second location is between the first threshold distance and the second threshold distance, detecting a change in the distance between the first location and the second location; and
  in response to detecting the change in the distance between the first location and the second location:
   in accordance with a determination that a first set of criteria is satisfied, wherein the first set of criteria includes a criterion that is satisfied when the changed distance between the first location and the second location is between the first threshold distance and the second threshold distance:
    maintaining the first size of the first virtual object, wherein the first virtual object has the first size while the changed distance between the first location and the second location is between the first threshold distance and the second threshold distance; and
    displaying, via the display device, a second representation of the first virtual object based on the first virtual object having the first size, wherein a size of the second representation of the first virtual object is different from a size of the first representation of the first virtual object;
   in accordance with a determination that a second set of criteria is satisfied, wherein the second set of criteria includes a criterion that is satisfied when the changed distance between the first location and the second location is between a third threshold distance and a fourth threshold distance that is greater than the third threshold distance:
    modifying the first virtual object to have a second size that is different from the first size; and
    displaying a third representation of the first virtual object based on the first virtual object having the second size, wherein the first threshold distance is less than the third threshold distance, wherein the second threshold distance is less than the fourth threshold distance, and wherein the first virtual object has the second size while the changed distance between the first location and the second location is between the third threshold distance and the fourth threshold distance; and
   in accordance with a determination that a third set of criteria is satisfied, wherein the third set of criteria includes a criterion that is satisfied when the changed distance between the first location and the second location is between a fifth threshold distance and a sixth threshold distance:
    modifying the first virtual object to have a third size that is different from the first size and the second size; and
    displaying a fourth representation of the first virtual object based on the first virtual object having the third size, wherein the first threshold distance and third threshold distance are less than the fifth threshold distance, and wherein the second threshold distance and the fourth threshold distance are less than the sixth threshold distance, and wherein the first virtual object has the third size while the changed distance between the first location and the second location is between the fifth threshold distance and the sixth threshold distance.

18. The method of claim 17, wherein the second threshold distance is less than or equal to the third threshold distance.

19. The method of claim 17, wherein the second set of criteria includes a criterion that is satisfied when a determination is made that a detected gaze of a user or a field-of-view of an electronic device is not within a predetermined distance of a location that corresponds to the first location.

20. The method of claim 17, wherein the second set of criteria includes a criterion that is satisfied when the first virtual object has not changed prior to a representation of the first virtual object being displayed based on the first virtual object having the first size.

21. The method of claim 17, wherein:
in accordance with a determination that the change in distance between the first location and the second location has caused the distance between the first location and the second location to decrease, the second size is smaller than the first size; and
in accordance with a determination that the change in distance between the first location and the second location has caused the distance between the first location and the second location to increase, the second size is greater than the first size.

22. The method of claim 17, wherein:
the first size is a predetermined size that is based on one or more distances between the first threshold distance and the second threshold distance; and
the second size is a predetermined size that is based on one or more distances between the third threshold distance and the fourth threshold distance.

23. The method of claim 17, displaying the third representation of the first virtual object based on the first virtual object having the second size includes maintaining display of a representation of a second virtual object that is based on a sixth size.

24. The method of claim 17, wherein:
the first threshold distance and the second threshold distance correspond to a first set of distances; and
the third threshold distance and the fourth threshold distance correspond to a second set of distances; and
the first set of distances is contiguous with the second set of distances.

* * * * *